US012651333B2

(12) United States Patent
Ali et al.

(10) Patent No.: US 12,651,333 B2
(45) Date of Patent: Jun. 9, 2026

(54) QUANTIFICATION OF BARRETT'S OESOPHAGUS

(71) Applicant: Oxford University Innovation Limited, Oxford (GB)

(72) Inventors: Sharib Ali, Oxford (GB); Jens Rittscher, Oxford (GB); Barbara Braden, Oxford (GB); James Edward East, Oxford (GB); Adam Bailey, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 361 days.

(21) Appl. No.: 18/028,796

(22) PCT Filed: Sep. 29, 2021

(86) PCT No.: PCT/GB2021/052524
§ 371 (c)(1),
(2) Date: Mar. 28, 2023

(87) PCT Pub. No.: WO2022/069885
PCT Pub. Date: Apr. 7, 2022

(65) Prior Publication Data
US 2023/0334658 A1 Oct. 19, 2023

(30) Foreign Application Priority Data
Sep. 29, 2020 (GB) ..................................... 2015356

(51) Int. Cl.
G06T 7/00 (2017.01)
G06T 7/11 (2017.01)
G06T 7/62 (2017.01)

(52) U.S. Cl.
CPC .............. G06T 7/0012 (2013.01); G06T 7/11 (2017.01); G06T 7/62 (2017.01);
(Continued)

(58) Field of Classification Search
CPC . G06T 7/0012; G06T 7/11; G06T 7/62; G06T 2207/10016; G06T 2207/10068;
(Continued)

(56) References Cited

U.S. PATENT DOCUMENTS 10,736,559 B2    8/2020 Wang et al.
2019/0374155 A1*  12/2019 Wang ................... A61B 1/2736
(Continued)

FOREIGN PATENT DOCUMENTS

JP    2006 187551 A    7/2006
JP    2006 223376 A    8/2006
JP    2011 167529 A    9/2011

OTHER PUBLICATIONS

Ali, Sharib, et al. "Artificial intelligence-driven real-time 3D surface quantification of barrett's oesophagus for risk stratification and therapeutic response monitoring." medRxiv (2020): Oct. 2020. (Year: 2020).*
(Continued)

*Primary Examiner* — Andrae S Allison
(74) *Attorney, Agent, or Firm* — Thomas|Horstemeyer, LLP

(57) ABSTRACT
An area of Barrett's oesophagus in a subject's oesophagus is quantified from a video image signal representing a video image of the subject's oesophagus captured using a camera of an endoscope. Depth estimation on the frames to derive depth maps in respect of frames of the video image. Regions of the frames corresponding to an area of Barrett's oesophagus in the subject's oesophagus are segmented. A value of a geometrical measure of the area of Barrett's oesophagus is
(Continued)

calculated using the depth map and segmented region in respect of at least one of the frames.

24 Claims, 12 Drawing Sheets

(52) U.S. Cl.
CPC .............. *G06T 2207/10016* (2013.01); *G06T 2207/10068* (2013.01); *G06T 2207/30092* (2013.01)

(58) Field of Classification Search
CPC . G06T 2207/30092; G06T 2207/20084; G06T 2207/30096
See application file for complete search history.

(56) References Cited

U.S. PATENT DOCUMENTS

| | | | |
|---|---|---|---|
| 2020/0102349 A1* | 4/2020 | Wang | G01N 33/57419 |
| 2021/0192738 A1* | 6/2021 | Meguro | G16H 15/00 |
| 2024/0368703 A1* | 11/2024 | Laun | G16B 20/00 |

OTHER PUBLICATIONS

Cai, Shi-Lun, et al. "Using a deep learning system in endoscopy for screening of early esophageal squamous cell carcinoma (with video)." Gastrointestinal endoscopy 90.5 (2019): 745-753. (Year: 2019).*
Zhang, Qiao, et al. "Image segmentation with pyramid dilated convolution based on ResNet and U-Net." Neural Information Processing: 24th International Conference, ICONIP 2017, Guangzhou, China, Nov. 14-18, 2017, Proceedings, Part II 24. Springer International Publishing, 2017. (Year: 2017).*
Richards, D. G., T. H. Brown, and J. M. Manson. "Endoscopic ultrasound in the staging of tumours of the oesophagus and gastro-oesophageal junction." Annals of the Royal College of Surgeons of England 82.5 (2000): 311. (Year: 2017).*
Espino, Alberto, et al. "Advanced imaging technologies for the detection of dysplasia and early cancer in Barrett esophagus." Clinical Endoscopy 47.1 (2014): 47. (Year: 2014).*
Soper, Timothy D., Michael P. Porter, and Eric J. Seibel. "Surface mosaics of the bladder reconstructed from endoscopic video for automated surveillance." IEEE Transactions on Biomedical Engineering 59.6 (2012): 1670-1680. (Year: 2012).*
Ebigbo, Alanna, et al. "Computer-aided diagnosis using deep learning in the evaluation of early oesophageal adenocarcinoma." Gut 68.7 (2019): 1143-1145. (Year: 2019).*
International Search Report and Written Opinion for WO 2022/069885 (PCT/GB2021/052524), dated Jan. 18, 2022, pp. 1-18.

UK Search Report for GB 2015356.5, dated Mar. 25, 2021, pp. 1-3.
Ali Sharib et al: "A Pilot Study on Automatic Three-Dimensional Quantification of Barrett's Esophagus for Risk Stratification and Therapy Monitoring", Gastroenterology, vol. 161, No. 3, Jun. 8, 2021 (Jun. 8, 2021), pp. 865-878.e8.
Rau Anita et al: "Implicit domain adaptation with conditional generative adversarial networks for depth prediction in endoscopy", International Journal of Computer Assisted Radiology and Surgery, Springer, DE, vol. 14, No. 7, Apr. 15, 2019 (Apr. 15, 2019), pp. 1167-1176.
Mehmet Turan et al: "Unsupervised Odometry and Depth Learning for Endoscopic Capsule Robots", arxiv.org, Cornell University Library, 201 Olin Library Cornell University Ithaca, NY 14853, Mar. 2, 2018 (Mar. 2, 2018).
Maitra Ishaan et al: "Towards screening Barrett's oesophagus: current guidelines, imaging modalities and future developments", Clinical Journal of Gastroenterology, Springer Japan, Japan, vol. 13, No. 5, Jun. 3, 2020 (Jun. 3, 2020), pp. 635-649.
Anaparthy R, Gaddam S, Kanakadandi V, et al. Association between length of Barrett's esophagus and risk of high-grade dysplasia or adenocarcinoma in patients without dysplasia. Clin Gastroenterol Hepatol. 2013;11(11):1430-1436. doi:10.1016/j.cgh.2013.05.007.
Menke-Pluymers MB, Hop WC, Dees J, van Blankenstein M, Tilanus HW. Risk factors for the development of an adenocarcinoma in columnar-lined (Barrett) esophagus. The Rotterdam Esophageal Tumor Study Group. Cancer. 1993; 72(4): 155-1158. doi: 10.1002/1097-0142(19930815)72:4<1155::aid-cncr2820720404>3.0.co;2-c.
Sharma, P, Dent, J, Armstrong, D. et al. The Development and Validation of an Endoscopic Grading System for Barrett's Esophagus: The Prague C & M Criteria.Gastroenterology, 2006; 131(5): 1392-1399.
Schmidt, R and Singh, K. Meshmixer: An Interface for Rapid Mesh Composition. ACM SIGGRAPH 2010; 6:1.
Q. Wang, A. Khanicheh, D. Leiner, D. Shafer, and J. Zobel. Endoscope field of view measurement. Biomed. Opt. Express 2017; 8:1441-1454.
Zhengyou Zhang. A flexible new technique for camera calibration. IEEE Transactions on Pattern Analysis and Machine Intelligence 2000; 22(11): 1330-1334.
J. Park, Q.-Y. Zhou, and V. Koltun, Colored Point Cloud Registration Revisited, ICCV, 2017.
LC. Chen, Y. Zhu, G. Papandreou, F. Schroff, A. Hartwig, "Encoder-Decoder with Atrous Separable Convolution for Semantic Image Segmentation", The European Conference on Computer Vision (ECCV), 2018, pp. 833-851.
DP. Kingma, and LJ Ba. Adam: A method for Stochastic Optimization. International conference on Learning Representations (ICLR), 2015.
Liu et al., "Dense Depth Estimation in Monocular Endoscopy With Self-Supervised Learning Methods", IEEE Trans Med Imaging. May 2020;39(5):1438-1447.
Mahmood et al., "Deep learning and conditional random fields-based depth estimation and topographical reconstruction from conventional endoscopy", Med Image Anal. Aug. 2018;48:230-243.

* cited by examiner

Residual feature pyramid network                    Upsampling

Depth prediction

ResNeXt-101        132 Deformable Convolution        Linear Convolution +ReLU

Linear convolution +ReLU x2        Linear Convolution + Sigmoid

ML Segmentation — 41

Shape fitting — 42

(a)

(b)

Top of
Gastric fold

Area=19.75 sq. com

Barrett's area quantification by fitting ellipse to the Barrett's and its corresponding depth map in mm Barrett's area quantification by fitting circles to the Barrett's area and its corresponding depth map in mm Patients with known Barrett's Oesophagus attending
endoscopy first time in Oxford (no treatment)

Two consecutive endoscopy visits

Pre- and post-treatment

Virtual endoscopy

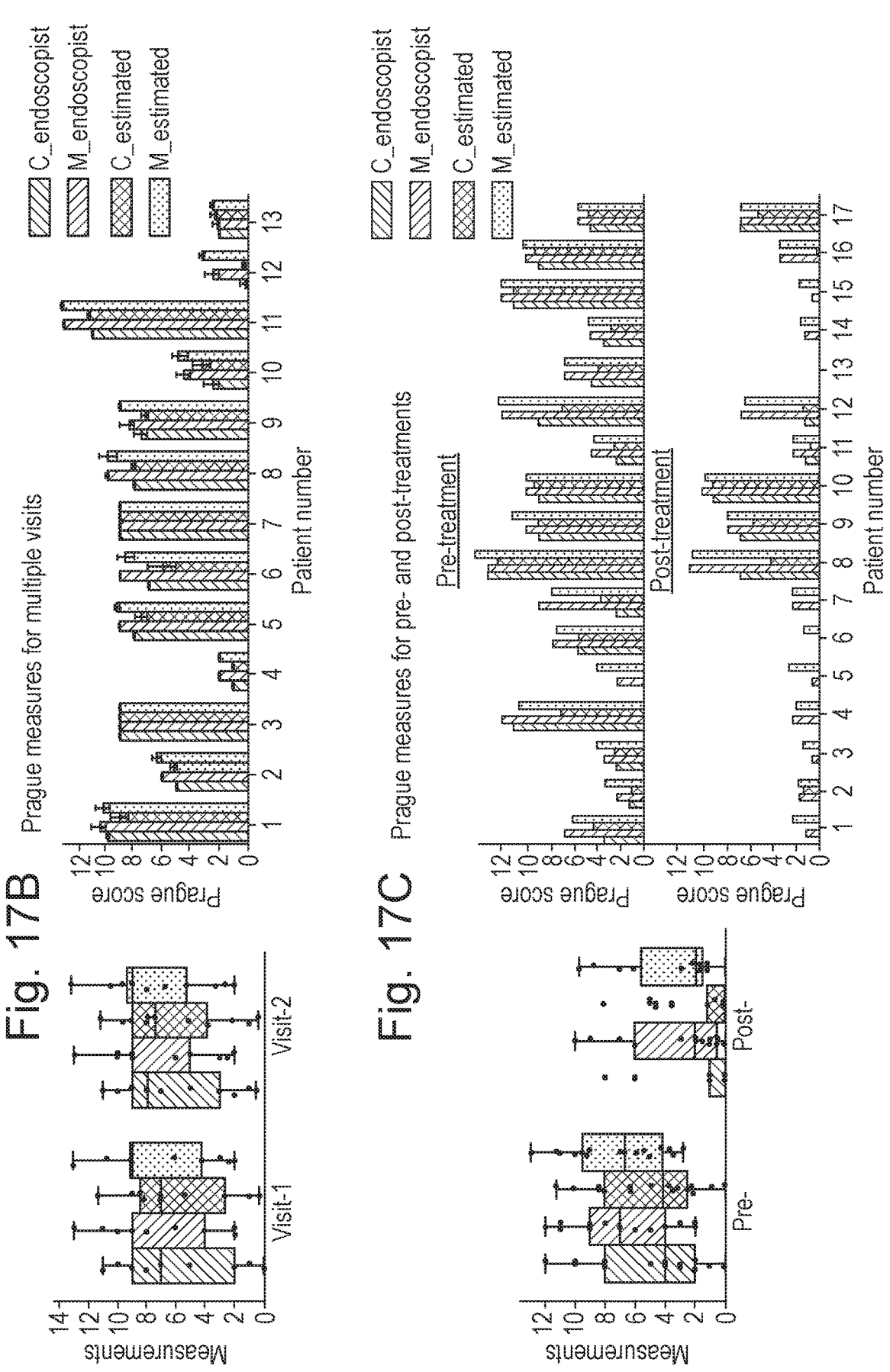

QUANTIFICATION OF BARRETT'S OESOPHAGUS

CROSS-REFERENCE TO RELATED APPLICATIONS

This application is the National Stage of International Application No. PCT/GB2021/052524, filed Sep. 29, 2021, which claims priority to GB 2015356.5, filed Sep. 29, 2020, which are entirely incorporated herein by reference.

The present invention relates to investigation of Barrett's oesophagus using video endoscopy.

Barrett's oesophagus is a pre-cancerous condition of the oesophagus where the normal cells lining the oesophagus are replaced with abnormal cells. The abnormal cells start around the opening of the oesophagus into the stomach and spread upwards. Barrett's oesophagus is associated with an annual progression rate to oesophageal adenocarcinoma (EAC) at 0.12-0.13% per year. In patients with this condition, the oesophageal squamous mucosa is replaced by columnar lined epithelium in response to acid reflux. Understanding on how Barrett's oesophagus develops over time in response to acid reflux from the stomach is still limited. Regions of Barrett's oesophagus may also be referred to as regions of Barrett's epithelium. Striking transcriptional similarities between cells from oesophageal submucosal glands and from Barrett's epithelium imply that the repeated reflux ulcerations uncover the submucosal glands from beneath the squamous epithelium and, subsequently, the glands are stimulated to produce protective mucus, proliferate and replace the damaged epithelium.

Endoscopic surveillance is recommended in patients with Barrett's oesophagus to detect dysplasia and oesophageal cancer, should it develop, as in early stages endoscopic management is still possible with a curative outcome. For patients with a long Barrett's oesophagus segment≥3 cm the annual progression rate to adenocarcinoma is significantly higher (0.25% per year) than for short Barrett's length<3 cm (0.07% per year). Therefore, the guidelines of the British Society of Gastroenterology recommend 2-3 year surveillance intervals for long Barrett's oesophagus (>3 cm) and longer intervals (3-5 years) for short Barrett's oesophagus with similar length based recommendations form the ESGE.

During endoscopy, Barrett's oesophagus is identified by the salmon-coloured mucosa compared to the more whitish appearance of the squamous epithelium. The widely established Prague classification indicates the circumferential length (C) from the gastro-oesophageal junction to the proximal limit of the circumferential extent of the area of Barrett's oesophagus, and the maximal length (M) from the gastro-oesophageal junction to the maximal limit of the area of Barrett's oesophagus. The length is measured from the gastro-oesophageal junction (defined by the top of the gastric folds) into the distal oesophagus. The Prague classification is used as risk stratification tool to determine the interval for surveillance endoscopy, as discussed in [1]. It is widely recommended in US, European and British guidelines as the optimal clinical classification tool for Barrett's oesophagus however only 22% of US gastroenterologists report it routinely. The estimation of this measurement is highly operator dependent where the difficulty of determining the "top of the gastric folds" due to differences in insufflation is one contributing factor.

According to a study done by Anaparthy et al., every centimetre increase in M-length of Barrett's, the risk of progression to high-grade dysplasia or EAC increases by 28% (p=0.01). Increased Barrett's segment≥3 cm showed significantly greater prevalence of dysplasia (23% vs 9%, p=0.0001). Similarly, the Rotterdam Esophageal Tumor Study Group presented the risk of nearly doubling the EAC (p<0.05).

The Prague classification is only a rough estimate for the extent of the Barrett's epithelium. Islands of columnar lined epithelium are ignored in the Prague classification but are encountered in a third of patients with Barrett's oesophagus; in about half of those the islands are located proximal to the farthest extent of the Barrett's segment and can be large especially after radiofrequency ablation. Barrett's islands can also harbour dysplasia or EAC and their histology upgrades the overall Barrett's epithelium dysplasia grade in 15.7% of cases. Excluding Barrett's islands, the Prague classification likely underestimates the total area of Barrett's epithelium.

As current endoscopic surveillance programs are costly, time consuming and poorly adhered to, better risk stratification of patients with Barrett's oesophagus to tailor surveillance recommendations is highly desirable. To date, automated, quantitative assessment of the Barrett's length and area for risk stratification, or for direct before and after comparison following ablative treatment is not available. A research and clinical tool that provides quantitative assessment of the Barrett's area and allows to monitor morphological changes over time would be extremely helpful.

According to a first aspect of the present invention, there is provided a method of quantifying an area of Barrett's oesophagus in a subject's oesophagus from a video image sequence of the subject's oesophagus captured using a camera of an endoscope, the video image comprising successive frames, wherein the method comprises: performing depth estimation on the frames to derive depth maps in respect of the frames; segmenting regions of the frames corresponding to an area of Barrett's oesophagus in the subject's oesophagus; and calculating a value of a geometrical measure of the area of Barrett's oesophagus using the depth map and segmented region in respect of at least one of the frames.

Using this method, it is possible to automatically provide a geometrical measure of the area of Barrett's oesophagus. This automatic determination relieves burden from clinicians, and also provides a measure that is more robust, and independent of variations due to the differing practice of individual clinicians.

In some embodiments, the step of performing depth estimation is performed using a machine learning technique. This type of technique is ideal when identifying characteristics of similar types of data, in this case images of the oesophagus, and can be robustly trained on existing data.

In some embodiments, the machine learning technique used in the step of performing depth estimation comprises a feature pyramid network. This type of network is well-suited to processing of images to identify features at different scales. In some embodiments, the feature pyramid network has a Residual Networks backbone. This allows for layer skipping steps that can allow faster training of the network.

In some embodiments, the machine learning technique used in the step of performing depth estimation has been trained using training data measured from a phantom and/or real patients. Data from phantoms can allow for accurate "ground-truth" data, i.e. known values of the parameters against which to train the network. It may be more challenging to obtain accurately known "ground-truth" values of the relevant parameters in training data from real patients, but these data have the advantage of being closer to the actual data on which the neural network will work in real-world usage. A mixture of both types of training data may be preferred.

In some embodiments, the step of performing depth estimation on the frames takes account of intrinsic parameters of the camera used to capture the video image. This improves accuracy of the depth estimation by accounting for possible artefacts or distortions introduce by the camera itself.

In some embodiments, the method further comprises a step of deriving the intrinsic parameters of the camera from the plural frames using a camera calibration technique. This can allow intrinsic parameters to be determined automatically each time the method is used, which can be more convenient for the operator. It may also improve accuracy, in case some intrinsic parameters change between patients.

In some embodiments, the depth maps represent depths relative to the gastro-oesophageal junction. This provides a convenient reference consistent with that commonly used in existing methods.

In some embodiments, the step of segmenting regions of the frames is performed using a machine learning technique. This type of technique is ideal when identifying characteristics in similar types of data, in this case images of the oesophagus, and can be robustly trained on existing data.

In some embodiments, the machine learning technique used in the step of segmenting regions of the frames comprises an encoder-decoder framework. This type of network is particularly suited to extracting parameters from images by forming simplified representations of the images in its hidden layer.

In some embodiments, the encoder-decoder framework has a Residual Networks backbone. This allows for layer skipping steps that can allow faster training of the network.

In some embodiments, the method further comprises fitting a shape to the segmented regions of the frames corresponding to an area of Barrett's oesophagus in the subject's oesophagus, the step of calculating a value of a geometrical measure of the area of Barrett's oesophagus using the depth map and the shape fitted to the segmented region in respect of at least one of the frames. This allows for a more accurate determination of the actual area of Barrett's oesophagus. When determining an area, the nature of the shape may also be varied depending on a trade-off between precision of the determined area against computational speed.

In some embodiments, the geometrical measure is at least one of a circumferential length in accordance with the Prague classification from the gastro-oesophageal junction to the proximal limit of the circumferential extent of the area of Barrett's oesophagus; a maximal length in accordance with the Prague classification from the gastro-oesophageal junction to the maximal limit of the area of Barrett's oesophagus; and the geometrical area of the area of Barrett's oesophagus. Determining the Prague classification may be more convenient for users accustomed to making clinical decisions based on Prague classification. Determining a geometrical area of Barrett's oesophagus may provide a more accurate measure of the actual extent and severity of the Barrett's oesophagus.

In some embodiments, the value of the geometrical measure of the area of Barrett's oesophagus is calculated from the depth map and segmented region in respect of one of the frames. This provides an accurate measure of the total area of Barrett's oesophagus with relatively high precision.

In some embodiments, said one of the frames is selected on the basis of user input. This allows an experienced user to select the most appropriate frame which allows for the most accurate determination of the geometrical measure based on the visibility of the Barrett's oesophagus.

In some embodiments, the value of the geometrical measure of the area of Barrett's oesophagus is calculated from the depth maps and segmented regions in respect of plural frames. Combining many frames may allow for more information to be incorporated, thereby reducing error.

In some embodiments, the step of deriving a geometrical measure of the area of Barrett's oesophagus comprises: estimating a camera pose in respect of each frame from plural frames of the video image and intrinsic parameters of the camera; deriving a three dimensional image of the area of Barrett's oesophagus from the segmented regions, the depth maps and the estimated camera poses in respect of plural frames; and calculating the value of the geometrical measure of the area of Barrett's oesophagus from the three-dimensional image. Using a three-dimensional image may provide a useful visualisation for clinicians of the extent of Barrett's oesophagus, thereby aiding in clinical decisions. Estimating camera pose is well-understood from computer vision and allows for accurate determination of the three-dimensional image.

In some embodiments, the reconstructed surfaces are used as a reference to assess a patient's response to therapy. Measures of statistical change detection can be applied to detect changes in area and mucosal pattern formation.

In some embodiments, biopsy locations are marked up and the corresponding histology information is being linked with the 3D reconstructed surface. According to a second aspect of the present invention, there is provided a computer program capable of execution by a computer apparatus and configured, on execution, to cause the computer apparatus to perform a method according to the first aspect of the present invention. The computer program may be stored on a computer-readable storage medium.

According to a third aspect the present invention, there is provided an analysis apparatus for analysing a video image signal comprising successive frames of an endoscopy procedure, wherein the analysis apparatus is arranged to implement a method similar to that of the first aspect of the present invention.

To allow better understanding, an embodiment of the present invention will now be described by way of non-limitative example with reference to the accompanying drawings, in which.

Some of the drawings include images taken by endoscope. In implementations of the invention, these images are typically colour images, although this is not visible in black-and-white drawings.

Figure 1:
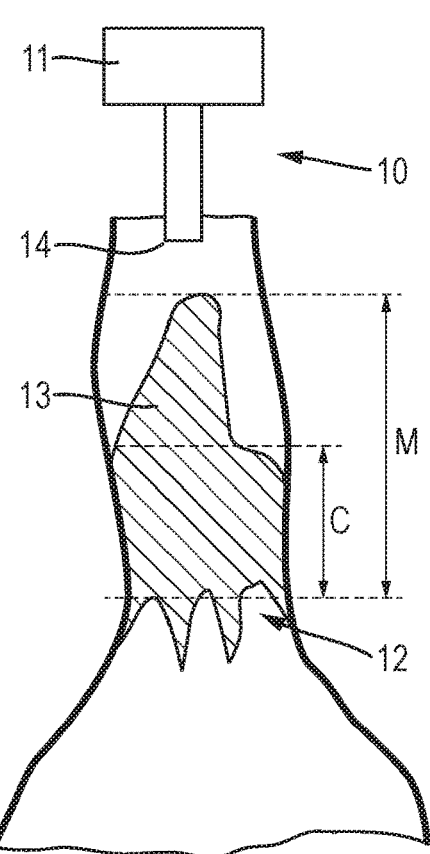
FIG. 1 is a schematic diagram of an endoscope imaging a subject's oesophagus having an area of Barrett's oesophagus.

FIG. 1 shows a schematic view of a subject's oesophagus in a subject exhibiting an area of Barrett's oesophagus. The shape of the Barret's oesophagus is defined with reference to the gastro-oesophageal junction 12.

Barrett's oesophagus is typically monitored by endoscopy. FIG. 1 shows an endoscope 10 having a camera 11. The camera captures a video image signal 20 representing a video image of the subject's oesophagus. The video image comprises successive frames and may also be referred to as a video image sequence. The endoscope 10 is shown schematically and may be in general of any known type.

Current analysis methods for determining an extent of Barrett's oesophagus use the Prague classification. This consists of two lengths C and M, as shown in FIG. 1. Oesophageal squamous mucosa 14 is shown as a light-coloured region, and areas of Barrett's oesophagus (mainly above the gastro-oesophageal junction) are shown in dark grey. Columnar cell linings 13 of Barrett's oesophagus are also shown, forming an intermediate region between the region where Barrett's oesophagus is circumferentially continuous, and where oesophageal squamous mucosa 14 are circumferentially continuous. FIG. 1 also depicts the C and M lengths taken from the top of gastric folds, i.e. the gastro-oesophageal junction 12, up to the squamo-columnar junction. The Prague classifications are a circumferential length C from the gastro-oesophageal junction to the proximal limit of the circumferential extent of the area of Barrett's oesophagus, and a maximal length M from the gastro-oesophageal junction to the maximal limit of the area of Barrett's oesophagus.

Figure 2A:
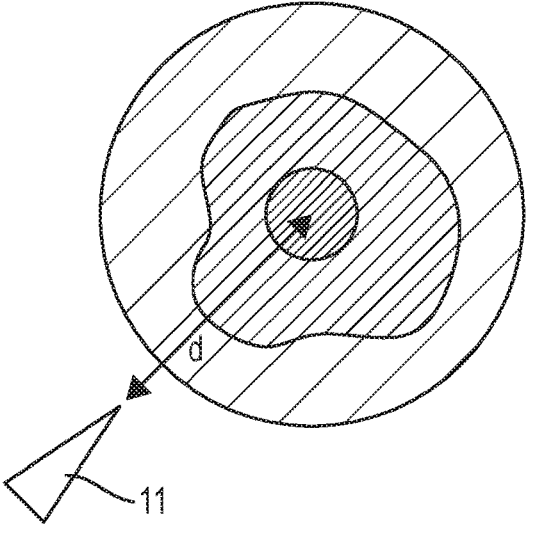
FIG. 2 is an example of determination of the Prague classification from an endoscope image.
Figure 2B:
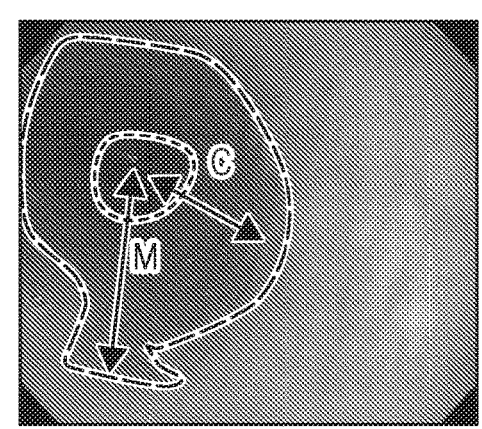

FIG. 2a) illustrates the measurement of the Prague classification based on the distance d of the endoscope camera 11 from the gastro-oesophageal junction. FIG. 2b) shows examples of C and M lengths determined from an endoscope image of a subject's oesophagus.

Currently, Prague classification is based on measurements of the position of the endoscope during endoscopy. The endoscope is advanced and withdrawn between the features that define the C and M lengths, and the length of advancement or withdrawal used to determine the lengths. This can be quite imprecise and potentially inaccurate in many cases. It may be difficult to accurately determine the alignment of the endoscope with the relevant features, and difficult to precisely measure the advancement and withdrawal of the endoscope. The Prague classifications also do not account for features such as Barrett's islands that can increase some patient's risk. In addition, patients can have residual large Barrett's area after radiofrequency ablation (RFA) therapy, which may not be effectively reported in C & M lengths. This highlights that there is a need for more rigorous measurements in reporting of Barrett's patients. It is also critical to report measurements more precisely, for example in millimetres and not rounded-off cm lengths as done in the Prague classification.

To address these shortcomings, the present disclosure provides a method and corresponding system for Barrett's area quantification. The method utilises machine learning and computer vision techniques, including a real-time deep learning framework. The method may automatically measure Prague C & M lengths to assist endoscopists to achieve reliable automated Prague C & M lengths. The method may compute Barrett's oesophageal area (BEA) to quantify the area covered by Barrett's epithelium during endoscopy, which can be helpful to measure risks in patients with large island segments. The method may provide 3-dimensional reconstructions of the oesophageal surface with wider field-of-views from 2D endoscopic video images by leveraging camera-distances from the gastric-fold. This allows for exact measurements of Prague lengths and precise Barrett's area quantification to perform comprehensive risk analysis of Barrett's patients. The method is validated based on 3D-printed phantom video endoscopy data, and patient data with known measurements. The method allows for mm-scale measurements of both Barrett's lengths and area.

Figure 3:
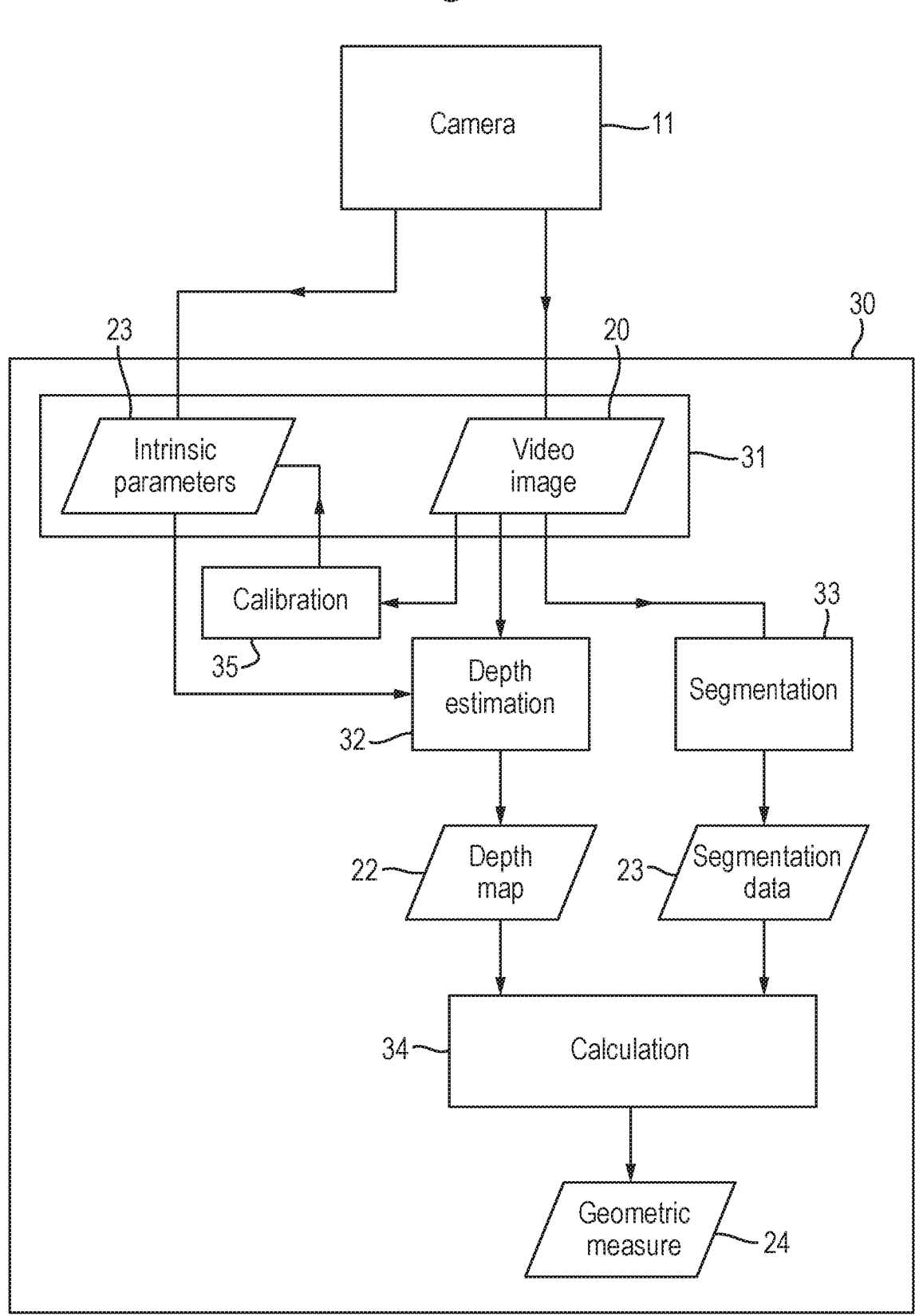
FIG. 3 is a functional block diagram of a camera and an analysis apparatus used to analyse a video image signal representing a video image captured by the endoscope.

FIG. 3 illustrates a method of analysing a video image signal 20 to quantify an area of Barrett's oesophagus in a subject's oesophagus. The video image signal 20 represents a video image of the subject's oesophagus. The video image is captured by the camera 11 of the endoscope 10 to produce the video image signal 20, and the video image comprises successive frames.

The video image signal 20 is input to an analysis apparatus 30 which receives the video image signal 20 and stores it in a storage unit 31 for subsequent analysis. The analysis may be performed in real time, or else the analysis may be performed offline at a later time.

The analysis apparatus 30 may be a computer apparatus which executes a computer program that, on execution, causes the analysis apparatus 30 to analyse the video image signal 20 to perform a method of quantifying an area of Barrett's oesophagus. FIG. 3 illustrates functional blocks that perform the steps of that method and are described in more detail below.

The computer apparatus may be any type of computer apparatus, but is typically a computer of conventional construction, for example a personal computer or an embedded device. The computer program may be written in any suitable programming language capable of execution by the computer apparatus. The computer program may be stored on a computer-readable storage medium, which may be of any type, for example: a recording medium which is insertable into a drive of the computing system and which may store information magnetically, optically or opto-magnetically; a fixed recording medium of the computer system such as a hard drive; or a computer memory.

The analysis of the video image signal 20 performed by the analysis apparatus 30 is as follows.

A depth estimator 32 performs depth estimation on the frames to derive depth maps 22 in respect of the frames. A segmentation unit 33 segments regions of the frames corresponding to an area of Barrett's oesophagus in the subject's oesophagus, thereby producing segmentation data 23. A calculation unit 34 calculates a value of a geometrical measure 24 of the area of Barrett's oesophagus using the depth map 22 and segmented regions in respect of at least one of the frames. Each of these will be discussed in further detail below.

The depth estimator 32 carries out a step of performing depth estimation on the frames to derive depth maps 22 in respect of the frames. The depth maps 22 represent depths relative to the gastro-oesophageal junction. The depth maps 22 may provide a depth for each point in the video image. The depth estimation is performed using a machine learning technique. In general, any suitable machine learning technique may be used, such as a deep-learning framework.

Figures 4, 5:
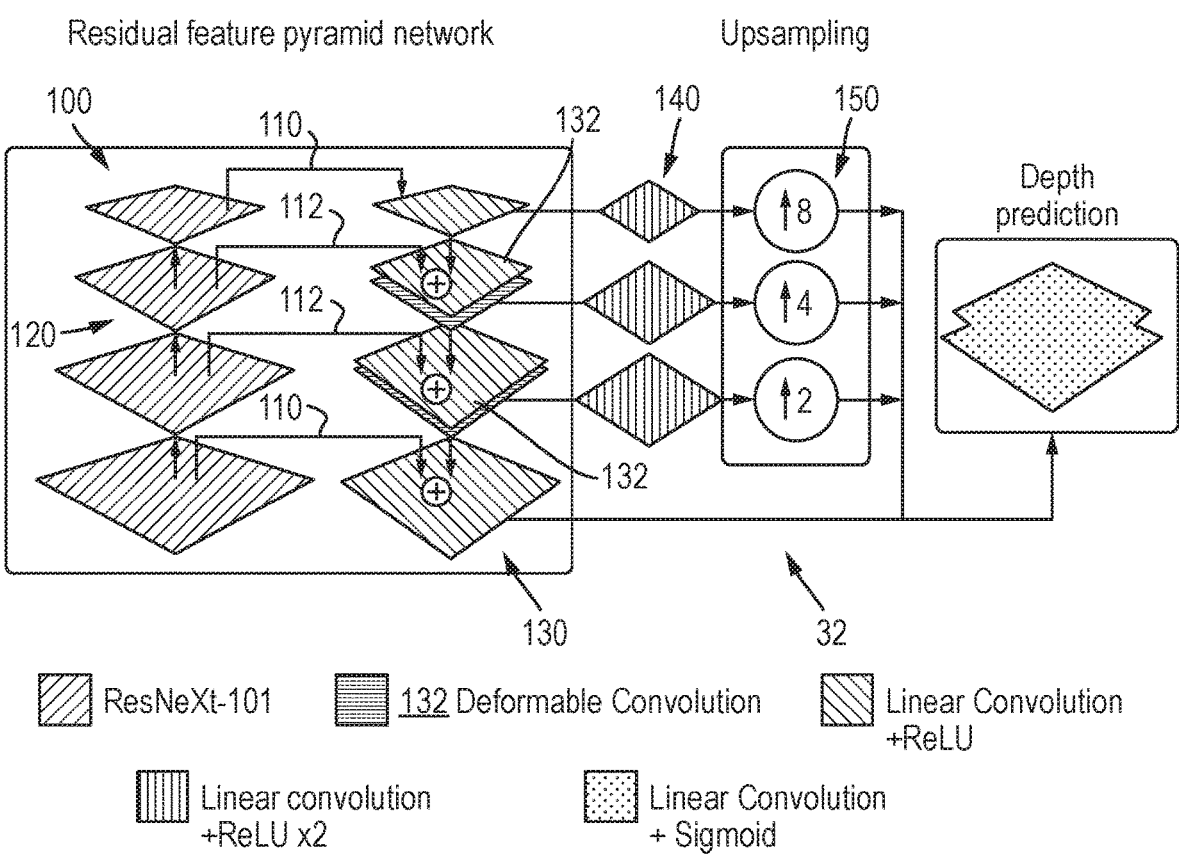
FIG. 4 is a diagram of an example of a depth estimator of the analysis apparatus.
FIG. 5 is a functional block diagram of an example of a segmentation unit of the analysis apparatus.

FIG. 4 shows an example of the depth estimator 32 employing a machine learning technique that comprises a feature pyramid network, specifically a residual feature pyramid network (RFPN) 100. The RFPN 100 allows the extraction of features and semantics at multiple scales. The feature pyramid network has a residual networks backbone. The RFPN 100 comprises a bottom-up pathway 120, in this case formed of the residual networks ResNeXt-101 backbone pretrained on imageNet, and a top-down pathway 130. A series of lateral connections 110, 112 connect the layers of the bottom-up pathway 120 and top-down pathway 130 at various levels in the pathways. As mentioned above, this allows for layer skipping. In FIG. 4, lateral connections 110, 112 are provided between layer of the bottom-up pathway 120 and the corresponding layer of the top-down pathway 130. However, in general more or fewer lateral connections 110, 112 may be provided. In order to increase the receptive field and to tackle occlusions due to local deformations, non-linear deformable convolution kernels 132 are incorporated in the two middle lateral connections 112 of the RFPN together with a linear convolution. This is not essential however, and may not be present in other embodiments.

The upscaled layers in the top-down pathway 130 on the right side of the RFPN 100 are subsequently convolved with a sequence 140 of linear convolution kernels and ReLU activation functions. An upsampling block 150 applies upsampling to the outputs of the sequence 140 such that the outputs are converted to have the same dimension. After upsampling by the upsampling block 150, the feature maps are concatenated, and the result is used to obtain the depth map 22 of depths θ using a linear 3×3 convolution filter and a non-linear sigmoid function.

The performance of depth estimation on the frames takes account of intrinsic parameters 23 of the camera 11 used to capture the video image. The intrinsic parameters 23 are stored in the storage unit 31. The intrinsic parameters 23 may include one or more of focal length, image sensor format, lens distortion, or any other intrinsic camera parameters 23. Some intrinsic parameters 23 may change between uses of the camera 11, and others may be constant for the camera 11, but differ compared to other cameras.

There are two options for obtaining the intrinsic parameters 23. The first option is to input intrinsic parameters 23 to the analysis apparatus 30 which receives the intrinsic parameters 23 and stores them in the storage unit 31. For example, the intrinsic parameters 23 may be manually input by a user, or may be stored by the camera 11 and transmitted to the analysis apparatus 30. The second option is for a camera calibration unit 35 of the analysis apparatus 30 to derive the intrinsic parameters 23 from the plural frames using a camera calibration technique. Camera calibration techniques to obtain intrinsic camera parameters are well-known, and any suitable technique may be used.

It is necessary to train the machine learning technique used by the depth estimator 32. In some embodiments, the machine learning technique may be partially pre-trained on a standard dataset such as imageNet. The machine learning technique used in the step of performing depth estimation is trained using training data measured from a phantom and/or real patients. The phantom may be a physical model of an oesophagus with features simulating an area of Barrett's oesophagus.

The machine learning technique is trained using a loss function. The loss function is used to minimise the difference between the estimated depth $$\theta_i^p$$

that is output by the machine learning technique and the ground truth depth $$\theta_i^{GT}.$$

The ground truth depth is the "correct" depth. This may be a clinician-determined measurement in the case of training data from real patients. The ground truth depth may be a measured depth in the case where a physical phantom is used, or a simulated depth where a digital phantom model is used.

In general, any suitable loss function may be used depending on the nature of the machine learning technique that is used. In the case of the machine learning technique of FIG. 4, an example of a suitable loss function utilises four different loss terms defined below:

a) Depth loss is computed as the root mean square error (RMSE) in log scale:

$$L_d = \frac{1}{n}\sum_{i=1}^{n}\sqrt{\ln^2\theta_i^{GT} - \ln^2\theta_i^p} \qquad (3)$$

b) Gradient loss is the $l_1$ norm of the difference between gradient of the depth maps to penalise errors around edges.

$$L_g = \frac{1}{n}\sum_{i=1}^{n}\left\|\nabla\theta_i^{GT} - \nabla\theta_i^p\right\|_1 \qquad (4)$$

c) Surface normal loss: The normal vector loss computed from ground truth depth $$n_i^{GT}$$

and predicted depth $$n_i^p.$$

$$L_n = \frac{1}{n}\sum_{i=1}^{n}\left(1 - \frac{< n_i^{GT}, n_i^p >}{\sqrt{< n_i^{GT}, n_i^{GT} >}\sqrt{< n_i^p, n_i^p >}}\right) \qquad (5)$$

d) Reconstruction loss: It is computed as the l2-norm between the reconstructed 2D images from the estimated depth maps (see Eq. (2) below). This loss is computed only if two frames are fed to the network.

$$L_r = \frac{1}{n}\sum_{i=1}^{n}\|X_{t-i\to(t-i-1)} - X_{(t-i-1)}\|_2 \qquad (6)$$

The final loss function is given by a linear combination of three loss functions $L=L_d+\beta_1\cdot L_g+\beta_2\cdot L_n$, with $\beta_1=10$ and $\beta_2=1$, after optimisation using an Adam optimiser as disclosed in [8]. The fourth loss function $L_r$ is used only to evaluate the estimated depth with respect to the ground truth depth.

The segmentation unit 33 carries out a step of segmenting regions of the frames corresponding to an area of Barrett's oesophagus in the subject's oesophagus.

FIG. 5 shows further detail of the segmentation unit of FIG. 3. The segmentation unit 33 comprises a machine learning segmentation unit 41, and the step of segmenting regions of the frames is performed using a machine learning technique. The machine learning technique may be any suitable technique, and may be different from the machine learning technique used to derive the depth maps 22. For example, the machine learning technique used by the machine learning segmentation unit 41 in the step of segmenting regions of the frames comprises an encoder-decoder framework.

The encoder-decoder framework has a residual networks backbone, specifically a ResNet-50 backbone. The encoder-decoder framework further comprises atrous separable convolutions (referred as DeepLabv3+, discussed in [7]) for segmentation of the frames of the video image to identify the areas of Barrett's oesophagus.

The hollow area inside the segmented Barrett's area determined the gastric folds and thereby the gastro-oesophageal junction. Also, we used simple area elimination to eliminate small island like objects as post-processing step (block in red). Colour and texture features may be used to identify the centre of the gastro-oesophageal junction (i.e. the opening to the stomach which will appear as a dark hollow area). Small dark regions that could affect this measurement may be eliminated in a post-processing step.

Figure 6:
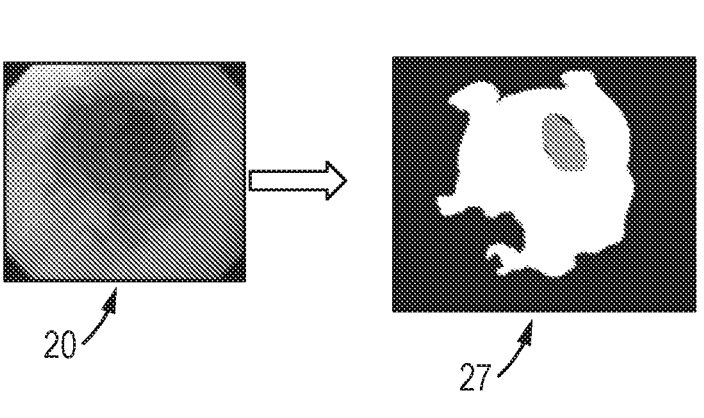
FIG. 6 shows examples of segmentation and shape fitting performed by the segmentation unit.
Figure 6:
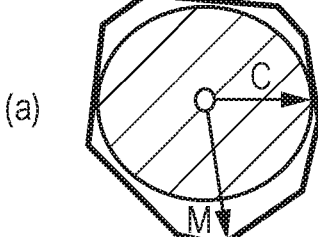
Figure 6:
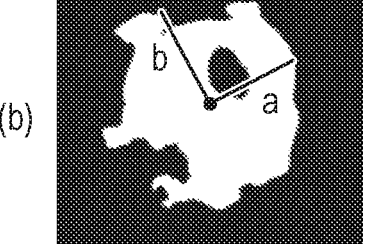

An example of segmentation is shown on the left of FIG. 6. The video image signal 20 (shown here by the corresponding frame of the video image) is segmented by the machine learning segmentation unit 41 to form segmented regions 27.

The segmentation unit further comprises a shape fitter 42. The shape fitter 42 carries out fitting of a shape to the segmented regions of the frames corresponding to an area of Barrett's oesophagus in the subject's oesophagus. The shape may be fitted in any suitable way, and any suitable shape may be used. The shape fitter 42 may choose the shape to be fitted based on the properties of the segmented regions. Two examples are shown on the left of FIG. 6. FIG. 6a shows convex-hull and circle fitting, and FIG. 6b shows parametric shape fitting of an ellipse (the semi-major axes a and b are shown). Other shapes may be fitted using parametric fitting, such as circles, rectangles, etc.

The calculation unit 34 carries out the step of calculating a value of a geometrical measure of the area of Barrett's oesophagus using the depth map and segmented region in respect of at least one of the frames. Where the segmentation unit 33 comprises a shape fitter 42, the calculation unit 34 uses the depth map 22 and the shape fitted to the segmented region.

The geometrical measure may be at least one of a circumferential length C in accordance with the Prague classification, and a maximal length M in accordance with the Prague classification. As discussed above, the circumferential length C is measured from the gastro-oesophageal junction to the proximal limit of the circumferential extent of the area of Barrett's oesophagus, and the maximal length M is measured from the gastro-oesophageal junction to the maximal limit of the area of Barrett's oesophagus.

For Prague classification C & M lengths, the centroid of a circle fitted using the convex-hull and circle fitting illustrated in FIG. 6a) provides the centre from which the circumferential length C and maximal length M are measured. Ideally the centroid will lie in close proximity to the gastro-oesophageal junction. The radius of the circle and the maximal length of the fitted convex-hull projected on the predicted depth map provide the circumferential length C and maximal length M, respectively.

Figure 7:
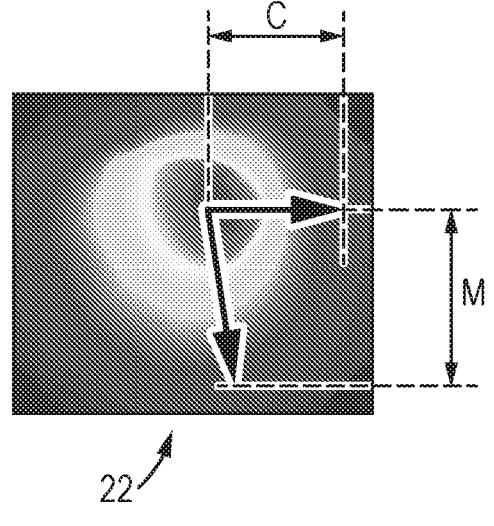
FIG. 7 shows an example of determination of the Prague classification performed by the calculation unit.
Figure 7:
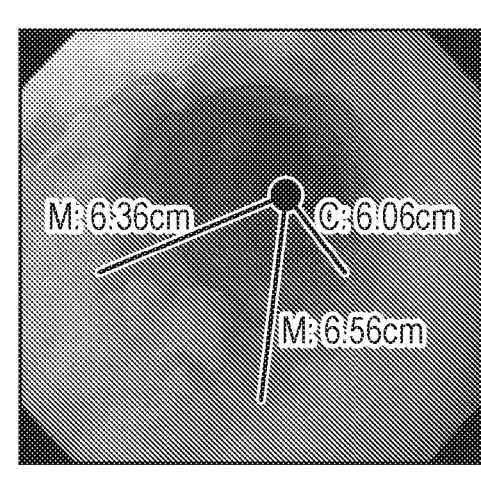

FIG. 7 demonstrates the combination of shape fitting with the depth map 22. The dimensions of the fitted shapes in the 2D frame are projected onto the depth map 22 to find the lengths, as shown on the right-hand side of FIG. 7. This exact measurement of the Prague classification lengths for Barrett's based on internal references in the oesophagus and camera distance measurements during endoscopy is more accurate than the currently-used crude estimation based on the withdrawal of the endoscope.

Figure 8:
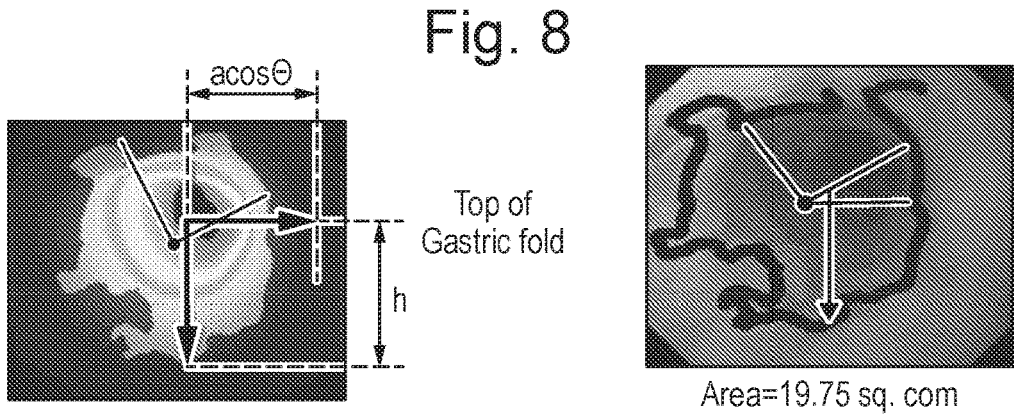
FIG. 8 shows an example of determination of geometrical area of Barrett's oesophagus performed by the computation unit.

The geometrical measure may additionally or alternatively comprise the geometrical area of the area of Barrett's oesophagus, i.e. a total surface area of Barrett's oesophagus within the oesophagus of the subject. For determining the geometrical area, parametric shape fittings by the shape fitter 42 are used as illustrated in FIG. 6b). The geometrical area can then be computed by projecting the area of the parametric shape in the 2D frame with the corresponding depth from the depth map 22, as illustrated in FIG. 8.

Figure 9A:
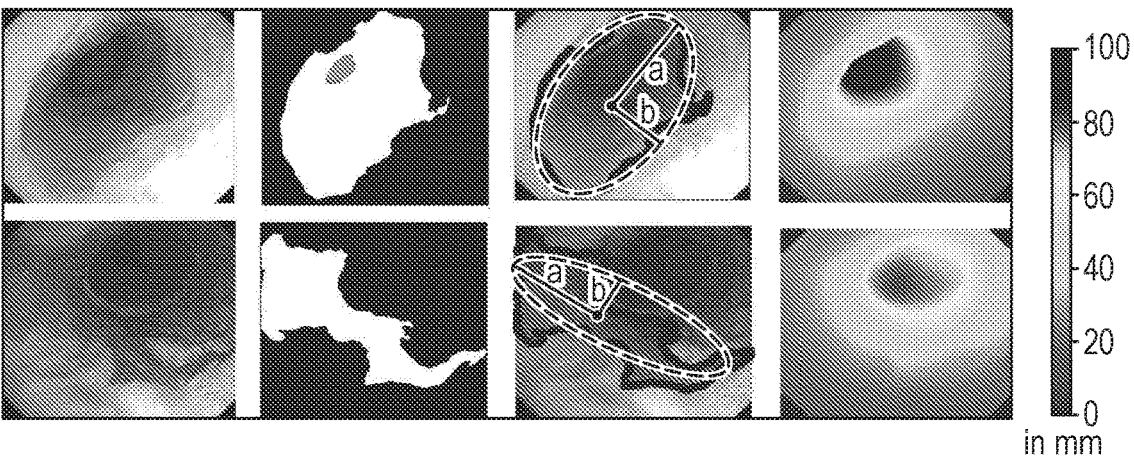
FIG. 9 shows further examples of determining the geometrical area of Barrett's oesophagus.
Figure 9B:
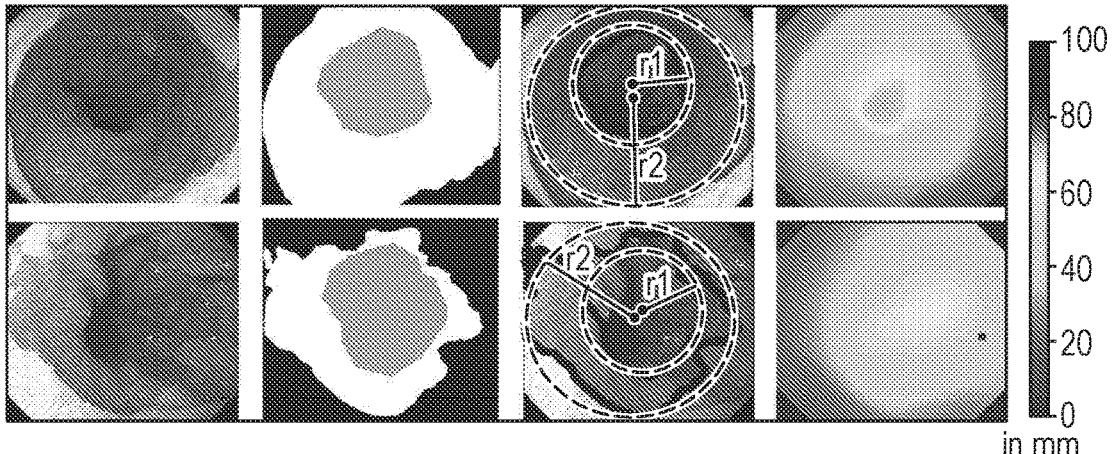

FIG. 9 shows examples of geometrical area calculation in real data for two different patients before and after RFA treatment. It illustrates the choices of shape fittings is based on the shape of the segmented Barrett's surface. FIG. 9A shows elliptical shape fitting on the segmented mask of patient ID 3080 (see Table 1). The top row of FIG. 9A shows a pre-treatment area of 62.05 sq. cm. The bottom row of FIG. 9A shows a post-treatment area of 26.73 sq. cm. FIG. 9B shows circle fitting on the segmented mask of patient ID 2006. In this case, the parametric shape fitting comprised fitting two concentric circular area measurements. The area between the two circles was used to eliminate the area around the gastric fold. The top row of FIG. 9B shows a pre-treatment area of 47.92 sq. cm. The bottom row of FIG. 9B shows a post-treatment area of 5.21 sq. cm.

It can be observed in FIG. 9 that patient 3080 in FIG. 9A, reporting C=0 and M=0 post-treatment still had considerable large untreated BEA island post-treatment. Such island areas could potentially harbour cancer or dysplasia. This demonstrates the value of the present invention in allowing the determination of a geometrical area of Barrett's oesophagus for quantification of therapy response. The quantification of the entire area of Barrett's epithelium is plausibly a better tool for risk stratification to measure progression to Barrett's neoplasia than the currently used Prague classifications in length. Barrett's area in combination with dysplasia grade or quantified pit pattern morphology might guide determination of intervals for endoscopic Barrett's surveillance in future.

The following assumptions are generally made for computations of both Prague classification lengths and the geometrical area:

1) The oesophagus is sufficiently insufflated and the gastric folds are visible, and
2) The camera 11 of the endoscope is held perpendicular to the gastro-oesophageal junction.

In the case of violation of above assumptions (which may occur during large Barrett's segments and invisible gastric folds). The quantification can still be performed using done by the method using plural frames of the video image, which will be discussed further below.

As well as the different geometrical measures that may be calculated, there are two options for performing the calculation of the geometrical measures.

Figure 10:
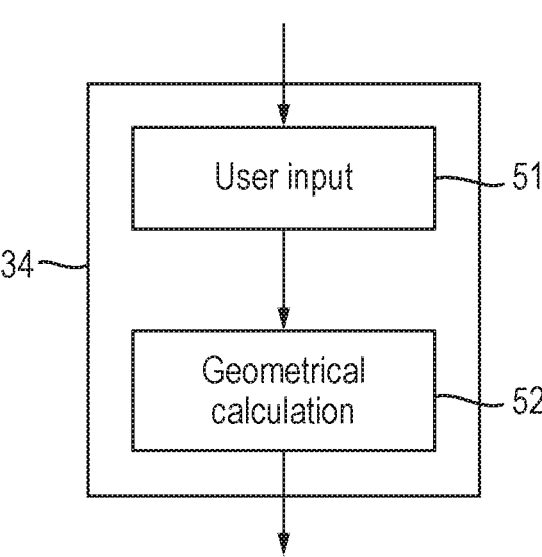
FIG. 10 is a functional block diagram of a first example of a calculation unit of the analysis apparatus.

The first option is to calculate the geometrical measure using a single one of the frames of the video image. An example of the configuration of the calculation unit 34 in such an embodiment is shown in FIG. 10. The calculation unit comprises a user input unit 51. The user input unit 51 may comprise a touch screen, keyboard, or any other suitable input device, and is configured to receive an input from a user. The user input unit 51 may display a plurality of frames of the video image on a display for the user to select from. The said one of the frames is selected on the basis of user input. The calculation unit 34 then comprises a geometrical calculation unit 52. The value of the geometrical measure of the area of Barrett's oesophagus is calculated from the depth map and segmented region in respect of the selected one of the frames, as discussed above. The value of the geometrical measure computed from the selected frame is output as a final value for future use.

An advantage of this first option is that the computation is relatively rapid, and can be performed in real-time directly from the depth estimation (online). For example, the analysis system 30 may perform the calculation of one or both of the Prague classification and the geometrical area on each frame as it is transmitted from the camera 11 in real time. The result of the calculations can then be displayed along with the frame itself, and the user may select the frame using the user input unit 51 on the basis of their observation of the frames and calculated geometrical measures in real-time.

Figure 11:
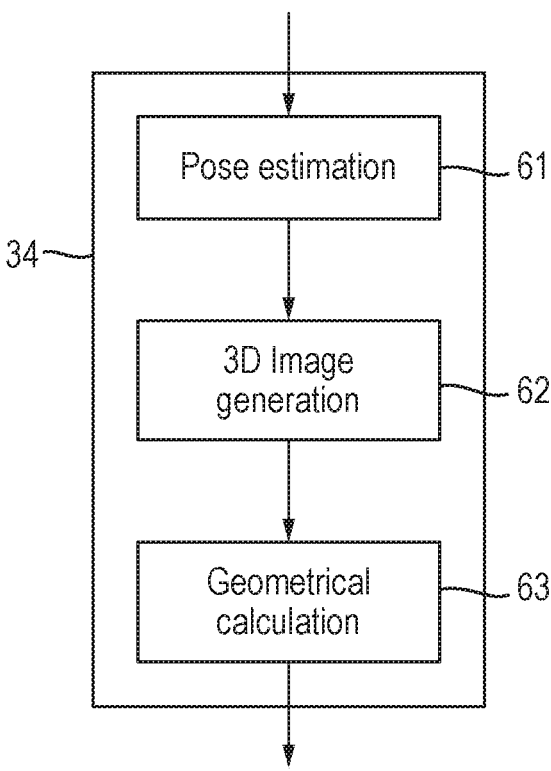
FIG. 11 is a functional block diagram of a second example of the calculation unit of the analysis apparatus.

The second option is that the value of the geometrical measure of the area of Barrett's oesophagus is calculated from the depth maps and segmented regions in respect of plural frames. An example of the configuration of the calculation unit 34 in such an embodiment is shown in FIG. 11. The calculation unit 34 comprises a pose estimation unit 61, a 3D image generation unit 62, and a geometrical calculation unit 63. Each of these is discussed further below.

The pose estimator 61 carries out a step of estimating a camera pose in respect of each frame from plural frames of the video image and intrinsic parameters 23 of the camera 11. Camera pose may also be referred to as extrinsic camera parameters. The pose estimator 61 may implement a pose estimation algorithm such as open3D (as disclosed in [6]) to estimate SE3 transformation (camera rotation and translation) between two image frames. This will produce a camera pose matrix E that can then be used by the 3D image generator 62 and geometrical calculation unit 63.

The 3D image generator 62 carries out a step of deriving a 3D image of the area of Barrett's oesophagus from the segmented regions, the depth maps and the estimated camera poses in respect of plural frames. The 3D image generator 62 achieves this by mosaicking of the depths from depth maps 22 and the plural frames of the video image. Given estimated depth $\theta_t$ and $\theta_{t-1}$ for frames $X_t$ and $X_{t-1}$ with the position and orientation of the camera 11 represented by the camera pose matrix $E_{t \to t-1}$, the projected 3D points for a single image can be written using Eq. (1) with (x, y) as image pixel coordinates.

$$p_t^{xy} = \theta_t^{xy} \cdot K^{-1}[x, y, 1]^T \tag{1}$$

K is the camera intrinsic matrix obtained by the offline camera calibration (an example of which is disclosed in [2]). The mapping of image co-ordinates at time t to t−1 allows to transform frame $X_t$ to $X_{t-1}$ using Eq. (1) and camera pose matrix $E_{t \to t-1}$:

$$\tilde{X}_{t \to t-1}^{xy} = X_t^{\hat{x}\hat{y}}, [\hat{x}, \hat{y}, 1]^T = KE_{t \to t-1}\left(\theta_{t-1}^{xy}, K^{-1}[x, y, 1]^T\right) \tag{2}$$

Similarly, this process is repeated for n frames with sufficient overlap giving an extended field-of-view for Barrett's quantification. This may be required for longer Barrett segments. At sufficient insufflation of the oesophagus, the measured depths can be leveraged to calculate the Barrett's segment lengths without any internal references.

Reconstruction of the oesophagus with display of the oesophageal mucosa from the frames may be challenging, as the oesophagus is not a stiff ideal tube with given diameter. The lumen and wall tension is affected by factors such as peristalsis, respiratory movements and heart pulsations, air insufflation and regurgitation. Mosaicking the entire oesophageal organ from overlapping frames of the video image may therefore also take into account temporal changes by various movements of the oesophagus and patient's body.

Due to the need to process multiple frames, and the additional computational complexity, the calculation from plural frames to determine a 3D model is generally performed offline, i.e. not in real-time. The computed depth maps allow for efficient 3D reconstruction in all cases with no computational latency. However, the resulting model allows the clinician to examine the patient's oesophagus.

The geometrical calculation unit 63 then carries out a step of calculating the value of the geometrical measure of the area of Barrett's oesophagus from the three-dimensional image.

3D mosaicking to determine a three dimensional image of the area of Barrett's oesophagus is a stand-alone technique that can be performed in addition to the real-time method described above. Determining a three dimensional image may be preferable when there is no clear visibility of the squamo-columnar junction and the gastric folds together. For example, this can occur if the Barrett's extent is very large.

This allows the option to present the endoscopically-visualised oesophagus at the end of the procedure as a 3D map with automatic quantification of the area of Barrett's oesophagus. This can provide exact 3D, interactive maps for illustrative reporting of endoscopic procedures. The quantification may also include the area of Barrett's islands as described above. The automatic quantification combined with the precise automatic documentation of biopsy spots and encountered pathology provides a much more rigorous and accurate way to report Barrett's surveillance endoscopy, and corresponding histology requests.

The 3D image may be used as a reference to assess a patient's response to therapy. For example, measures of statistical change detection can be applied to detect changes in area and mucosal pattern formation and/or biopsy locations may be marked up and the corresponding histology information is being linked with the 3D image.

Advantages of the present method include:

a) Previously, no method was available to investigate and quantify the emergence of Barrett's oesophagus over time. The present method will allow monitoring of temporal morphological changes of Barrett's oesophagus during development or possible regression and in response to any treatment.

b) Quantification of the Barrett's area can be used as therapy control after ablative treatment of dysplastic Barrett's oesophagus, such as radiofrequency ablation, cryoablation, argon plasma coagulation or stepwise endoscopic resection.

c) The 3D reconstruction of the oesophageal mucosa allows the exact loco-histological determination of where biopsies have been taken, or the precise localisation in quantifiable dimensions of an encountered pathology such as lesions and abnormalities. This is in contrast to current techniques that report the localization using distance from the incisors in neutral position of the endoscope and the orientation on the clock-face regarding the oesophageal circumference.

Examples

A specific example of applying the method is described below.

Method

The study was performed at the Translational Gastroenterology Unit at the Oxford University Hospitals NHS Foundation Trust, a tertiary referral centre for endoscopic therapy of Barrett's oesophagus neoplasia, in collaboration with the Big data Institute and Department of Engineering Science at the University of Oxford. Patients with known Barrett's oesophagus coming for endoscopic surveillance or endoscopic treatment were included in this study. Patients undergoing upper endoscopy for dyspeptic and reflux symptoms or to investigate iron deficient anaemia served as controls. All patients included in the study provided a written informed consent for the recording of endoscopic videos and for the analysis of their clinical data. The study is registered as REC Ref. 16/YH/0247.

Figure 12:
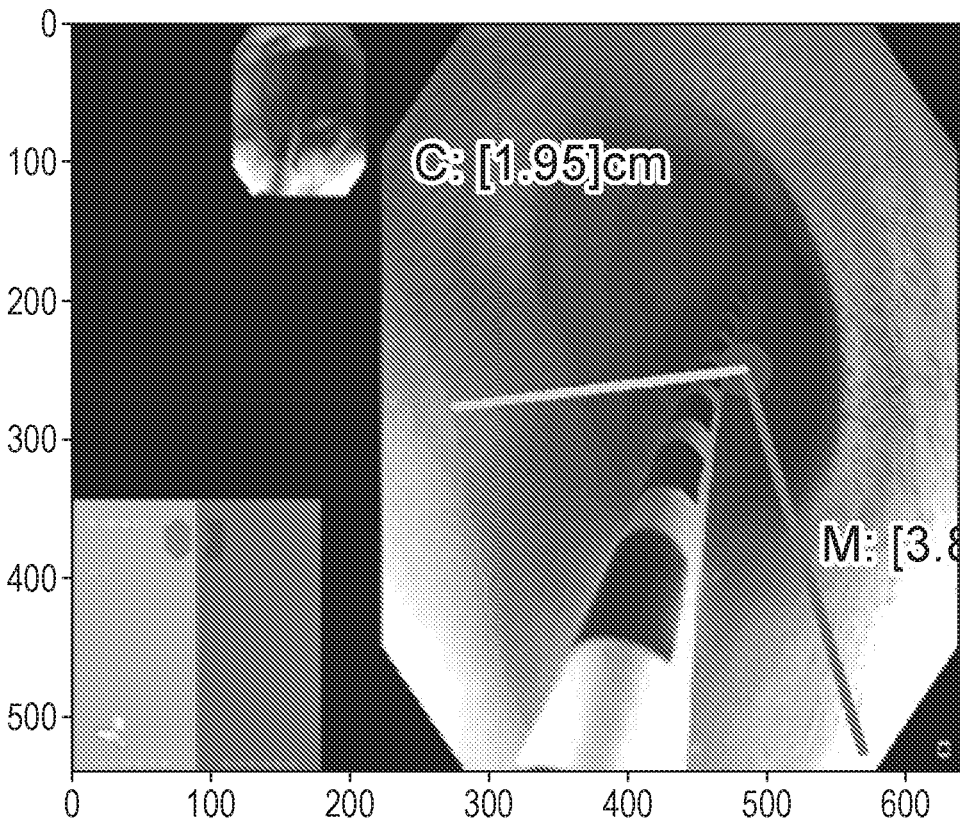
FIG. 12 is an endoscope image showing graduated biopsy forceps used in a standard measurement of the Prague classification.

High definition videos in white light endoscopy and narrow band imaging were prospectively recorded during endoscopy using Olympus endoscopes (GIF-H260, EVIS Lucera CV260, Olympus Medical Systems, Tokyo, Japan). Measuring and subtracting the distances from the tip of the inserted endoscope at the top of the gastric folds and at the proximal squamocolumnar margin to the incisors gives the standard circumferential and maximal length of the Barrett's oesophagus measurements. The Prague C & M lengths were reported for all endoscopies in patients with Barrett's oesophagus. A standard biopsy forceps with known shaft diameter of 2.8 mm (Radial Jaw 4™, Boston Scientific, US) was advanced through the instrument channel into the stomach until several of the 3 mm black markers on the shaft were visible. The biopsy forceps was held in fixed position during slow withdrawal of the endoscope through the oesophagus whilst recording. An example image including biopsy forceps is shown in FIG. 12.

The endoscopy patient cohort investigated included the following patient groups:

a) Dataset 1: 68 patients with known Barrett's oesophagus attending for their first endoscopy visit in Oxford before treatment;

b) Dataset 2: 13 patients with Barrett's oesophagus not receiving endoscopic treatment between two consecutive endoscopy visits; and c) Dataset 3: 17 patients with Barrett's oesophagus receiving endoscopic treatment for comparison of pre- and post-treatment measurements.

A detailed summary of the patient cohort data is provided in FIG. 13. The Prague lengths were endoscopically determined by two expert endoscopists. The average age of patients in this cohort is 67.5 years and most are men (89.7%).

Figure 13A:
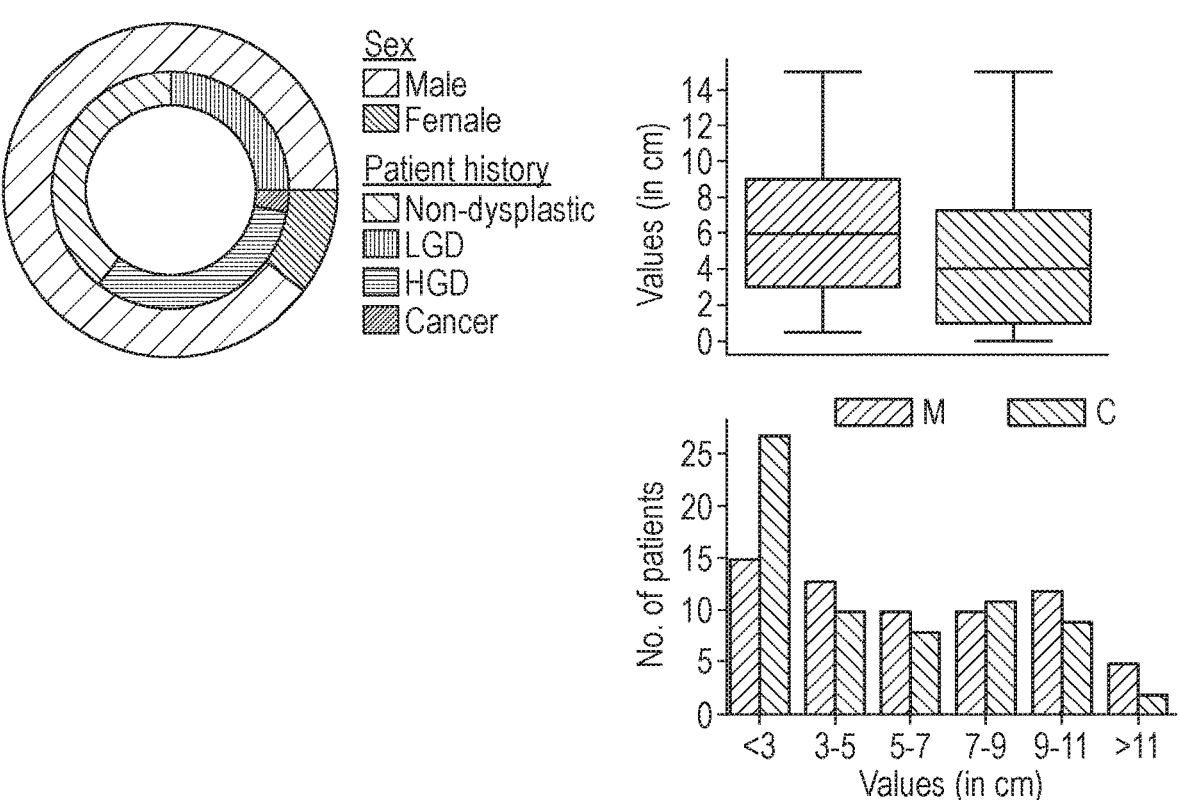
FIG. 13 is a summary of data of the patient cohort used in testing of the method.

FIG. 13A shows data from patients in Dataset 1-68 patients attending for their first visit (61 male and 7 female) with different histology (left, second ring of pie-plot) and subsequent treatment. Prague C & M lengths presenting variation in Barrett's length (centre) and patient numbers at different C & M lengths (right). Variable sizes of M and C lengths can be observed with a mean size of 6 cm for M-length and 4 cm for C-length (FIG. 13A, centre). A majority of patients had C-lengths less than 3 cm length while the M-lengths are predominantly higher (FIG. 13A, right).

Figure 13B:
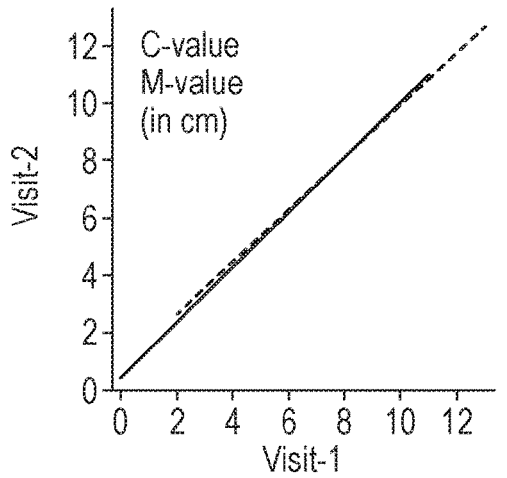

FIG. 13B shows results from patients in Dataset 2 (see also Table 3). C & M lengths measured at two consecutive visits after an average of 6 months (without treatment) is shown for the 13 patients. Solid lines represent the best-fit lines between the measurements. Reporting of the Prague C & M lengths is consistent in repeated visits with a marginal deviation only.

Figure 13C:
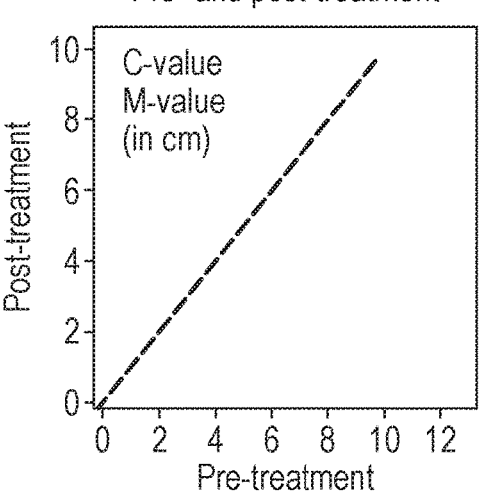

FIG. 13C shows results from patients in Dataset 3 (see also Table 3) relating to Prague C & M lengths of the 17 patients before and after treatment. The dashed line marks no changes between two measurements. Most post-treatment lengths show reduction in Barrett's extension under the dashed line, indicated by significantly reduced Prague C & M lengths in the post treatment measurement. 5 patient videos from this dataset were also used for BEA measurement.

A machine learning technique of the type shown in FIG. 4 was used, comprising a feature pyramid network with a ResNet101 backbone. The machine learning techniques was used to determine depth maps estimating the distance-of-camera (depth) from the gastro-oesophageal junction (GEJ) at sufficient insufflations, as described above.

Figure 14:
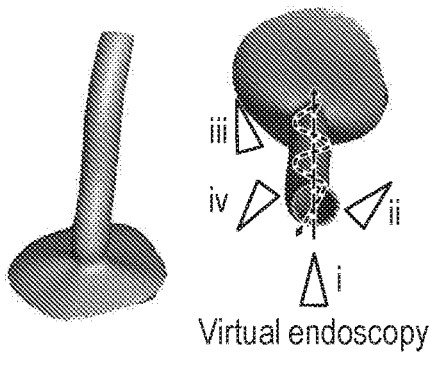
FIG. 14 shows simulated images used to derive training data for the depth estimator.
Figure 14:
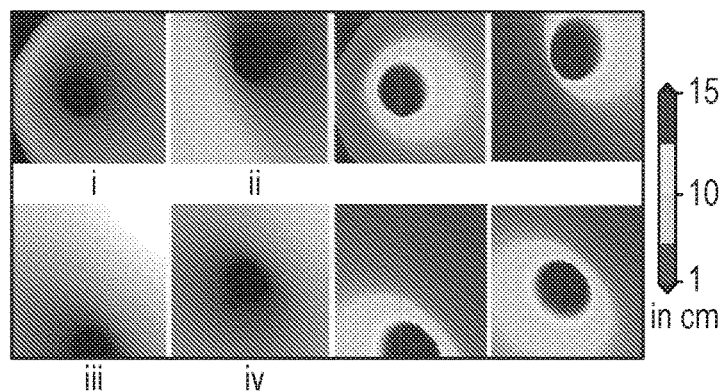

As shown in FIG. 14, a virtual 3D silicon model of 18.75 cm length and 2 cm internal diameter was printed using the information derived from the CT reconstructed oesophagus. A third-party Meshmixer software (disclosed in [2]) was used to design an unflattened oesophagus. The 3D model was then used to simulate endoscopies with known camera positions and trajectories with a single light source depicted as a quadratic fall-off illumination intensity (as done in [3]). Knowing camera positions and motion paths, accurate depth maps for multiple trajectory and lighting illumination scenarios were created using blender software.

The simulated data consisted of over 8,000 images with corresponding ground truth depth maps for 8 different camera trajectories that include spiral, random, straight and zigzag paths. The camera trajectories representing straight and spiral camera motion are shown with arrows (i-iv) on the left of FIG. 14. Different viewing angles and illumination strengths were used to mimic the real-world endoscopy system. The acquired images were 3 channel (RGB) and depth maps were 1 channel data of size 256×256 pixels.

The right-hand side of FIG. 14 shows the images acquired from each trajectory shown on the left of FIG. 14. and their corresponding depth maps (distance-from-camera) in cm. To address the tissue deformations and varying spatial morphology during oesophageal peristalsis, 5000 simulated colon data from well-established endoscopic depth prediction on a digital 3D phantom were also added (using techniques disclosed in [4]).

The machine learning technique for depth estimation was trained on 10,000 simulated video sequences with the 8 different camera motion trajectories within the 3D digital oesophagus model. The 10,000 simulated images included 6000 oesophagus and 4000 colon images with known (simulated) distance-from-camera (depth) measurements. The entire encoder-decoder network was trained for 50 epochs with 327 images and validated on 47 images. All images were resized to 256 pixels×256 pixels. Stochastic gradient descent with learning rate of 0.01 and momentum of 0.9 were used. The inference time reported was >35 frames-per-second. The network achieved an intersection-over-union score or over 78%.

Figure 15:
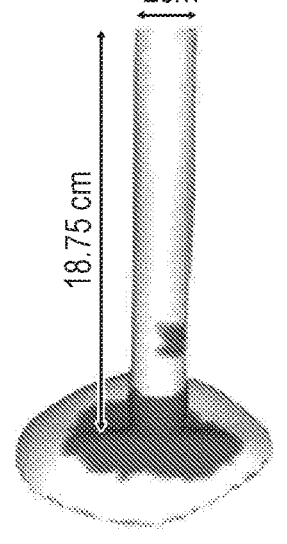
FIG. 15 shows a 3D printed phantom model of an oesophagus exhibiting Barrett's oesophagus used to derive the training data in FIG. 14.
Figure 15:
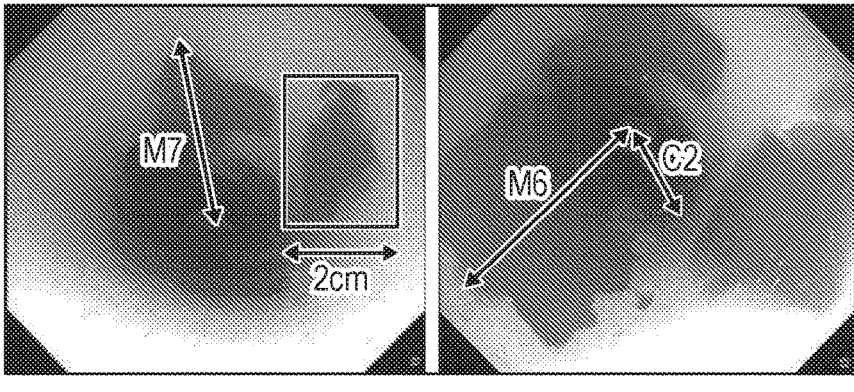

To evaluate the quantification and 3D reconstruction of Barrett's oesophagus a 3D printed phantom model with salmon-coloured coating of BEA was used. FIG. 15 shows a digital 3D model of the phantom, and two endoscope images of the interior of the 3D-printed phantom. 10 different endoscopy trajectory videos were recorded with the same gastroscope that were used to perform endoscopies in patients. Precise ground-truth measurements for C & M lengths (white arrows) and islands (black rectangle) within the 3D phantom were acquired with Vernier callipers. For area quantification, paints and mm-grid paper were used to establish a ground-truth for validation of the area measurement method. In addition to the existing salmon-coloured area, two additional extensions to both Barrett's area and island were included.

For 3D point projection to derive the three dimensional image of the area of Barrett's oesophagus, the intrinsic camera parameters were measured offline using checker-board pattern images acquired by the endoscope used in this study (GIF-H260 Olympus, as disclosed in [5]). For large C & M lengths, standardised markers on biopsy forceps (such as shown in FIG. 12) were used as internal reference to recalibrate for real-world mm-scale measurements using Meshmixer as described in [2]. Such recalibration is required only once but needs to be repeated for a different calibration setting. Finally, multiple poses are combined with the ego-motion obtained by open3D software for pose estimation to provide a registered 3D mosaicked surface.

Shape fitting methods were applied to the segmented Barrett's areas (BEA) and projected to the predicted depths from the depth maps to measure C & M lengths, and BEA. The performance of the method was assessed on high definition endoscopic videos of 1) the 3D printed phantom oesophagus model with Barrett's area coating described above, and 2) expert endoscopists C & M lengths for the 98 patients from datasets 1-3 above.

Three quantitative evaluation criteria were used when assessing the performance of the method:

I. Computed depth predictions from the depth estimator 32 were evaluated against ground-truth depths from the synthetic dataset (examples of which are shown in FIG. 14) on 3000 test data using established standard metrics. Here, $$\theta_i^{GT} \text{ and } \theta_i^{p}$$

represents ground-truth and predicted depths, respectively.

a. Relative Error (Rel.):

$$\frac{1}{n}\sum_{i=1}^{n} \frac{|\theta_i^{GT} - \theta_i^{p}|}{\theta_i^{GT}}$$

b. Root Mean Square Error (RMSE):

$$\frac{1}{n}\sum_{i=1}^{n} (\theta_i^{GT} - \theta_i^{P})^2$$

c. Root Mean Square Log Error (RMSE Log):

$$\frac{1}{n}\sum_{i=1}^{n} (\log_{10}\theta_i^{GT} - \log_{10}\theta_i^{P})^2$$

II. Analogous relative error and RMSE measures were used to quantify the maximal diameter of island, C and M, and BEA measurements on the phantom endoscopy data.

III. For the evaluation of automated Prague C & M lengths on patient data, the absolute difference is reported between the documented Prague lengths by expert endoscopists and measurements obtained from the present method.

As there were no previous studies on Barrett's oesophageal area (BEA) quantification available, no formal sample size calculation was carried out. Measurement of C & M lengths was carried out independent to the simulated data measurements. For this first visit patients were grouped (dataset 1) according to the reported C and M lengths. Due to small number of patients for dataset 2 and 3, they were quantified as a single group to have valid statistical analysis. The correlation was evaluated between the Prague lengths assessed by the endoscopists and the computer-aided quantitative measurements from the present method using Cohen's Kappa, Kendall's tau and Spearman correlation. Paired t-test and non-parametric Mann-Whitney tests were used to compute the significance between the automated Prague lengths from the present method compared to the reported lengths. For this p-values greater than 0.05 were considered statistically non-significant (ns).

Validation on Simulated Dataset (Virtual Endoscopy)

The errors in the predicted depth maps compared to the ground-truth depths were quantified on 2000 simulated oesophageal images (test data) rendered from a virtual endoscopy on a digital 3D oesophagus model using third-party blender software (FIG. 14). Five different endoscopy trajectory with three different lighting conditions were used to generate the test data.

TABLE 1

| Method | Simulated trajectory in oesophagus model | Errors measured (cm) | | |
| --- | --- | --- | --- | --- |
| | | RLE | RMSE | RMSE-log |
| FPN-ResNet101-Conv_smooth | Spiral-down | 0.0115 ± 0.0039 | 0.0270 ± 0.002 | 0.0166 ± 0.0003 |
| | Spiral-down (light 45°) | 1.336 ± 2.2025 | 0.9145 ± 0.9750 | 0.8256 ± 0.9721 |
| | Straight-up | 0.0116 ± 0.0041 | 0.0295 ± 0.0017 | 0.0163 ± 0.0002 |
| | Zigzag-down | 0.0887 ± 0.0893 | 0.0892 ± 0.0072 | 0.1331 ± 0.0396 |
| | Zigzag-up | 0.0459 ± 0.0252 | 0.0683 ± 0.0034 | 0.0671 ± 0.0055 |
| | Overall (Weighted average) | 0.0804 ± 0.4650 | 0.2257 ± 0.1978 | 0.2117 ± 0.2035 |
| FPN with combined smooth and deformable convolutions | Spiral-down | 0.0121 ± 0.0053 | 0.0253 ± 0.0015 | 0.0174 ± 0.0005 |
| | Spiral-down (light 45°) | 0.0249 ± 0.0165 | 0.0404 ± 0.0046 | 0.0441 ± 0.0038 |
| | Straight-up | 0.0125 ± 0.0061 | 0.0313 ± 0.0020 | 0.0176 ± 0.0003 |
| | Zigzag-down | 0.0869 ± 0.0843 | 0.0849 ± 0.0060 | 0.1353 ± 0.0388 |
| | Zigzag-up | 0.0123 ± 0.0034 | 0.0222 ± 0.0008 | 0.0168 ± 0.0002 |
| | Overall (Weighted average) | 0.0297 ± 0.0231 | 0.0408 ± 0.0029 | 0.0462 ± 0.0087 |

Table 1 shows the error measured for the predicted depth maps on virtual oesophageal endoscopy data. Errors are presented in cm. The best results are highlighted in bold. Table 1 shows results for two different configurations of the machine learning technique for depth estimation. It can be observed from Table 1 that the FPN with combined smooth and deformable convolutions obtained the lower errors for most trajectory data and reported the lowest average RMSE error of only 0.41 mm which is 1.85 mm less compared to a more conventional FPN network with only smooth convolutions.

Figure 16A:
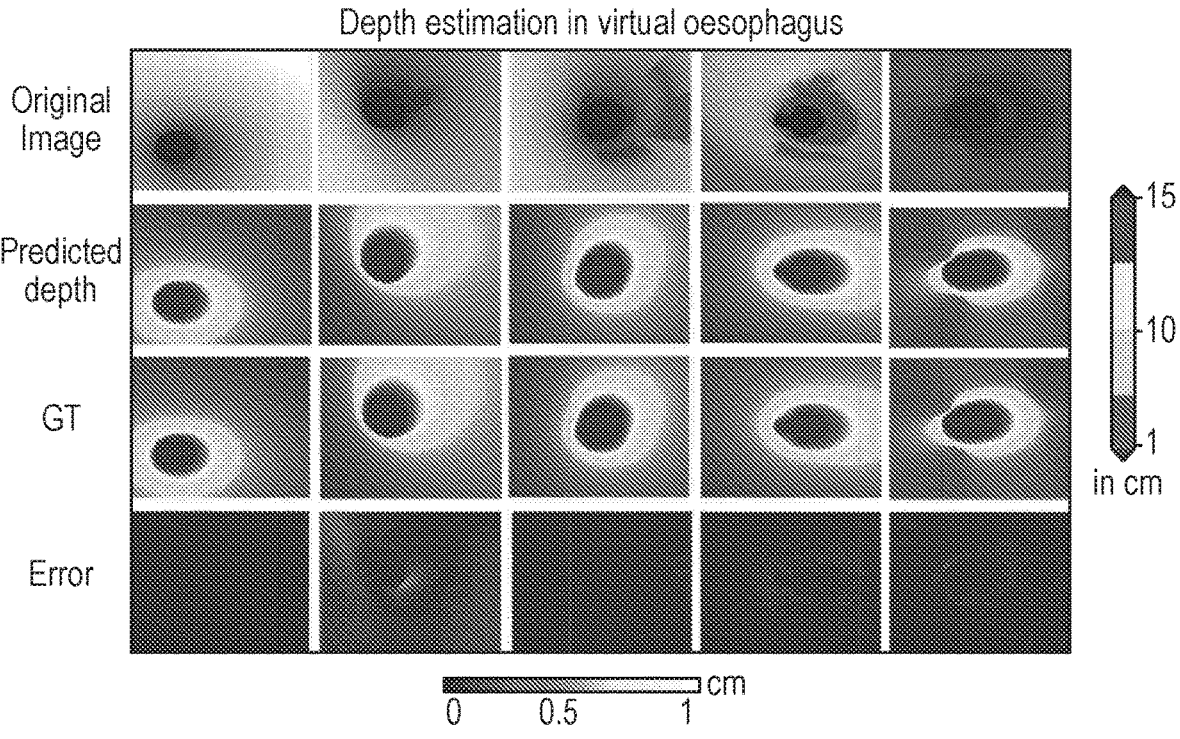
FIG. 16 shows results of depth-from-camera estimation and Prague C & M lengths.

FIG. 16A shows a comparison of estimated depth from the present method with respect to the predicted depth from the virtual oesophagus model in the simulated test dataset for oesophageal surfaces. The error in prediction is presented as the difference between the predicted and ground-truth (GT) distances. It can be observed that the predicted depths follow the pattern of camera view and are relatively smooth in all cases. The absolute difference between ground-truth and predicted maps represents the error in the distance prediction shown on the fourth row. All errors are less than 5.0 mm for the oesophageal model.

Figure 16B:
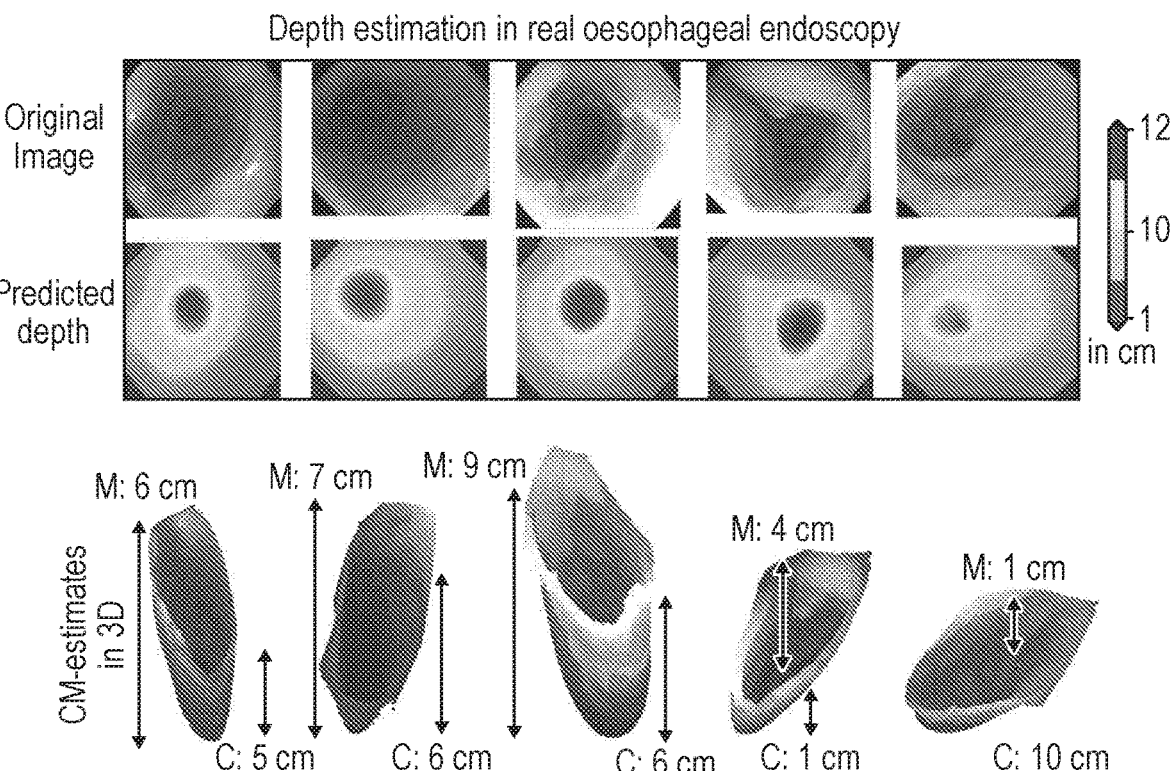

FIG. 16B shows results for the depth estimation on real gastroesophageal endoscopy data, showing a range of 0-12 cm distance measured from camera. The corresponding 3D views with their C & M lengths for patient endoscopy frames are also shown (scaled for visualisation). The Barrett's area segmentation, convex-hull fitting and mapping of predicted depths as illustrated in FIG. 6 has been applied for near real-time visualisation of the C & M estimates for our high-resolution video endoscopy (3.5 milli-second, nearly 27 frames-per-second). The 3D oesophagus image can be interactively rotated, zoomed and translated.

Validation on Phantom Endoscopy Dataset

Table 2 shows automated quantification Barrett's length C & M lengths, maximal island diameter, and BEA using oesophageal endoscopy video data acquired from the 3D printed phantom. The lengths of different Barrett's resembling positions were measured on the 3D printed phantom using Vernier callipers, while mm-scale grid paper and paint were used to measure the area for validation. The automated measurements from the proposed system are reported. Ma and Mb corresponds to M7 and M6, respectively (see FIG. 15). Similarly, the automated area measurements for three different Barrett's and island paintings areas are shown.

The present method achieves more than 95% average accuracy (4.2% relative error) and an average deviation from the ground truth of only 1.80 mm. In addition, the RMSE error was estimated to be 2.50 mm confirming a substantial agreement (k=0.72 and $r_s$=0.99) with the ground-truth measurements. Table 2 also demonstrates the validation of the Barrett's area quantification. It can be observed that marginal difference error (least) was obtained for Barrett's area A1 and island 1. This was because the original silicon painted salmon colour was prominently placed and did not affect segmentation and depth estimation. However, for the other two paints (which used water colours and were only superficially placed), the errors are higher. However, the average RMSE is only 1.59 $cm^2$, and only 1.11 $cm^2$ average deviation was observed compared to the ground-truth BEA, with moderate kappa agreement (k=0.42) and strong Spearman rank correlation ($r_s$=0.94).

These validation and reliability tests on three phantom endoscopy video data (with known measurements) show the efficacy of the BEA measurement. The study included three different island sizes and complete Barrett's areas.

TABLE 2

| Phantom Endoscopy Dataset | Barrett's markers | Measurements | | Errors | | | |
| --- | --- | --- | --- | --- | --- | --- | --- |
| | | Ground-truth | Automated | Abs. diff. | Relative error (%) | RMSE | Agreement |
| Length measurements (cm) | Ma | 7.07 | 6.95 | 0.12 | 1.70 | 0.25 | Spearman |
| | Mb | 6.90 | 6.37 | 0.53 | 7.68 | | rank |
| | C | 2.3 | 2.12 | 0.18 | 7.80 | | correlation = |
| | Island 1 | 1.99 | 2.05 | 0.06 | 3.01 | | 0.99 |
| | Island 2 | 1.22 | 1.21 | 0.01 | 0.82 | | Cohen's |
| | Overall (average) | 3.89 | 3.74 | 0.18 | 4.20 | | Kappa = |
| | | | | | | | 0.72 |
| Area measurements (sq. cm) | Barrett's A1 | 62.50 | 62.01 | 0.49 | 0.78 | 1.59 | Spearman |
| | Barrett's A2 | 68.50 | 65.03 | 3.47 | 5.06 | | rank correlation = 0.94 |

TABLE 2-continued

| Phantom Endoscopy Dataset | Barrett's markers | Measurements Ground-truth | Automated | Errors Abs. diff. | Relative error (%) | RMSE | Agreement |
|---|---|---|---|---|---|---|---|
| | Barrett's A3 | 76.50 | 78.07 | 1.57 | 2.05 | | Cohen's Kappa = 0.42 |
| | Island 1 | 3.50 | 3.61 | 0.11 | 3.14 | | |
| | Island 2 | 3.70 | 3.10 | 0.60 | 16.21 | | |
| | Island 3 | 3.00 | 2.55 | 0.45 | 15.00 | | |
| | Overall (average) | 36.28 | 35.72 | 1.11 | 7.04 | | |

Validation on Patient Dataset

Figure 17A:
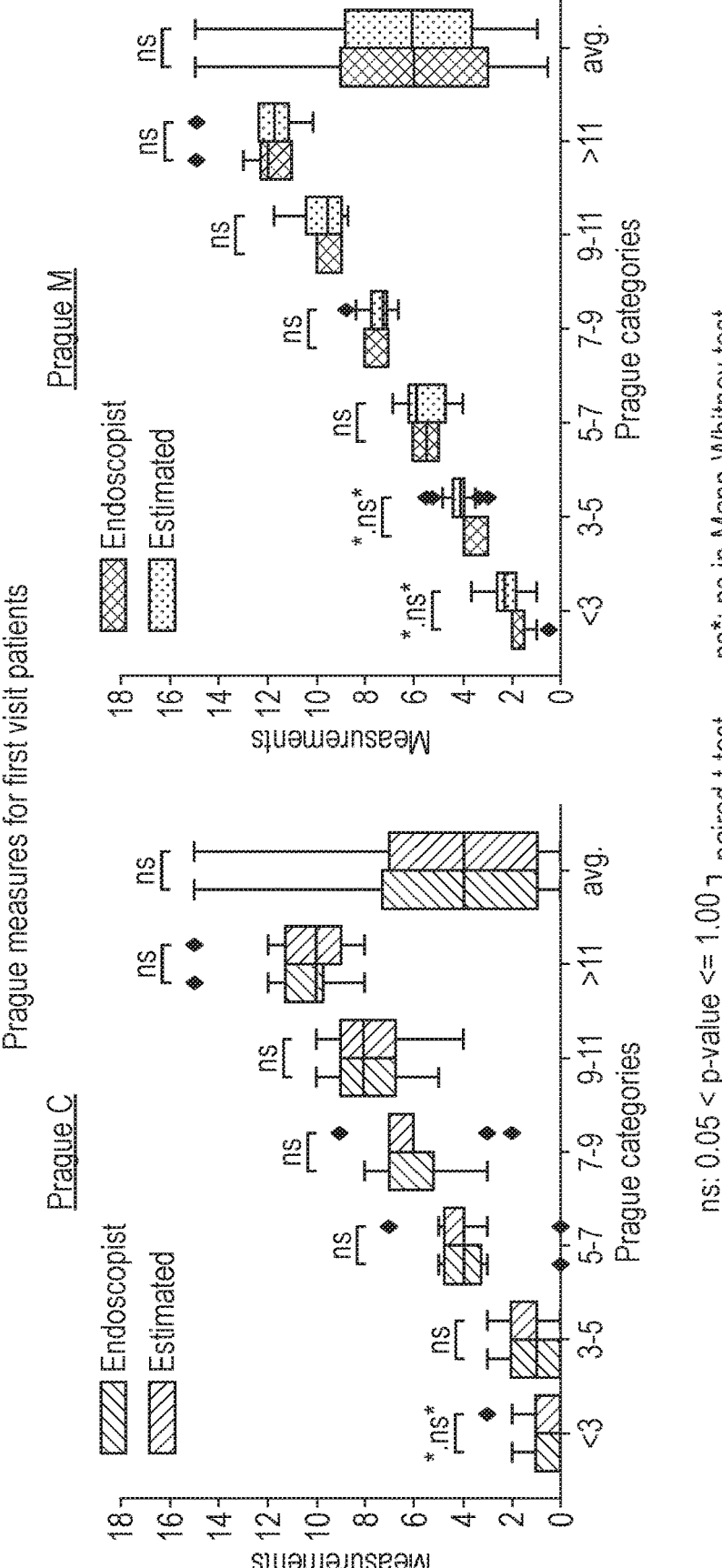
FIG. 17 shows results of measurements of Prague C & M lengths on 68 patient data.

FIG. 17 shows the comparison between Barrett's C & M lengths determined by the endoscopists, and the automated measurements from the present method in the patient cohort. FIG. 17A shows Prague C (left) & M (right) length comparison for various length categories (less than 3 to over 11 cm) for patients in dataset 1. Non-significant ($p > 0.05$) is represented as ns. Even though large deviations are observed for the patient group with short segment Barrett's oesophagus of less than 3 cm in C & M length (p-value$<0.05$; FIG. 16A), for almost all other groups the p-value is non-significant. The non-parametric Mann-Whitney test that is robust to outliers indicates non-significant p-values for all subgroups. The box-plots for all patients in this cohort show similar median, minimum and maximum deviations.

FIG. 17B shows endoscopists' measurements and measured Prague lengths for two consecutive patient visits for patients in dataset 2. It can be observed that no significant changes were observed (also refer to error bars for each patient on the right), and the present method correlated well with experts. The error bars in the bar plots of the C & M lengths for dataset 2 in FIG. 17B show only miniscule changes in measurements. This is also evident from Table 3, which shows 3.6 mm and 2.9 mm mean deviations for C & M lengths. Kappa agreement (k)$>0.7$ (substantial) and $>90\%$ for rank correlation measures ($\tau$ and $r_s$) was observed.

FIG. 17C shows pre-treatment and post-treatment measurements for patients in dataset 3, also shown for individual patients on the right. The box plot (left) shows decreased measurements for both C & M lengths computed by the expert and the present method.

Table 3 shows automated quantification of Prague classification C & M lengths from real patient video data in the cohort of patients with Barrett's oesophagus compared with the endoscopists' measurements. The mean deviation (absolute difference) for both C & M lengths for each group is less than 7 mm with an overall deviation of 4.5 mm and 6.0 mm respectively for Prague C & M lengths. The overall agreement between the C & M lengths reported by the expert endoscopists and the present method is expressed with k of 0.59 and 0.50 for C & M, respectively, and over 90% $\tau$ and $r_s$ on this dataset. Statistical measures to analyse the concordance between the automated measurements and measurements reported by the endoscopist are also provided. P.N=total patient number; Prag. Cat.=Prague Category; Avg.=overall Average.

TABLE 3

| Patient dataset | P. N. | Prag. Cat. | Automated Average (in cm) C | M | Expert Endoscopist Average (in cm) C | M | Agreement Kappa (k) C | M | Kendall's tau (τ) C | M | Spearman (r_s) C | M | Absolute difference (in cm) C | M |
|---|---|---|---|---|---|---|---|---|---|---|---|---|---|---|
| Dataset 1 | 15 | <3 cm | 0.87 | 2.16 | 0.67 | 1.73 | 0.65 | 0.36 | 0.89 | 0.33 | 0.63 | 0.34 | 0.24 | 0.51 |
| (First visit cases only) | 13 | 3-5 cm | 3.44 | 3.95 | 3.50 | 3.46 | 0.54 | 0.33 | 0.27 | 0.32 | 0.88 | 0.34 | 0.60 | 0.59 |
| | 10 | 5-7 cm | 5.44 | 5.55 | 5.25 | 5.5 | 0.30 | 0.23 | 0.36 | 0.28 | 0.63 | 0.30 | 0.62 | 0.63 |
| | 10 | 7-9 cm | 7.35 | 7.41 | 7.45 | 7.6 | 0.49 | 0.44 | 0.54 | 0.53 | 0.86 | 0.53 | 0.61 | 0.38 |
| | 12 | 9-11 cm | 9.16 | 9.77 | 9.44 | 9.41 | 0.63 | 0.46 | 0.48 | 0.60 | 0.92 | 0.64 | 0.37 | 0.56 |
| | 8 | >11 cm | 12.54 | 11.9 | 12.67 | 12.12 | 1 | 0.64 | 1 | 0.88 | 0.85 | 0.93 | 0.14 | 0.35 |
| | 68 | Avg. | 5.00 | 6.79 | 4.99 | 6.63 | 0.59 | 0.50 | 0.93 | 0.92 | 0.98 | 0.97 | 0.45 | 0.60 |
| Dataset 2 | 13 | Visit-1 | 6.06 | 7.37 | 6.08 | 7.23 | 0.65 | 0.71 | 0.91 | 0.91 | 0.96 | 0.96 | 0.37 | 0.31 |
| (Multiple visits, | 13 | Visit-2 | 6.12 | 7.50 | 6.26 | 7.42 | 0.74 | 0.71 | 0.97 | 0.95 | 0.99 | 0.98 | 0.34 | 0.28 |
| no treatment) | 13 | Avg. | 6.09 | 7.43 | 6.17 | 7.33 | 0.69 | 0.71 | 0.94 | 0.93 | 0.97 | 0.96 | 0.36 | 0.29 |
| Dataset 3 | 17 | Pre- | 5.06 | 7.10 | 5.29 | 7.00 | 0.60 | 0.54 | 0.88 | 0.91 | 0.95 | 0.96 | 0.63 | 0.55 |
| | 17 | Post- | 1.45 | 3.33 | 1.64 | 3.05 | 0.60 | 0.65 | 0.91 | 0.89 | 0.93 | 0.93 | 0.40 | 0.46 |
| (Pre vs post-treatment) | 17 | Avg. | 3.25 | 5.21 | 3.47 | 5.03 | 0.64 | 061 | 0.93 | 0.93 | 0.98 | 0.97 | 0.51 | 0.50 |

The automatic quantification of Barrett's extension and reconstruction from endoscopy against measurement after surgical oesophagostomy was not evaluated. However, the surgical resection specimen will also be subjected to shrinking artefacts and contractions and not present the true in-vivo dimensions.

Table 4 shows automated Barrett's area (BEA) quantification pre- and post-treatment for 5 patients. No ground-truth measurements are available in this case. The results in Table 4 demonstrate the applicability of the area measurement to quantify efficacy of ablation therapy. It can be observed that even though the C and M lengths are reduced for all 5 patients, in some cases the residual Barrett's area is more than 10 cm². In one case, residual BEA is as large as >26 cm², even though both C & M lengths are zero. Evidence for large Barrett's area (>10 sq. cm) post-treatment are underlined.

TABLE 4

| Patient ID. | Pre-treatment | | | Post-treatment | | |
| | C-value (cm) | M-value (cm) | Area (sq. cm) | C-value (cm) | M-value (cm) | Area (sq. cm) |
| --- | --- | --- | --- | --- | --- | --- |
| 1332 | 3 | 6 | 65.00 | 0 | 1 | 9.00 |
| 2006 | 2 | 3 | 47.92 | 0 | 0.5 | 5.21 |
| 2021 | 10 | 11 | 83.01 | 0 | 2 | 11.87 |
| 3080 | 4 | 6 | 62.05 | 0 | 0 | 26.73 |
| 3164 | 3 | 4 | 34.62 | 0 | 1 | 9.01 |

Qualitative Assessment of the Outputs of the Present Method

The Prague length reported by the endoscopists correlated well with the automatically measured lengths with an average standard deviation of ±4.5 mm and ±6.0 mm for C & M lengths, respectively, showing moderate (k=0.50) to substantial agreement (k=0.71) with endoscopists for patients with short or long Barrett's segments (Table 3).

Exceeding this, the quantitative validation on the endoscopic phantom video data demonstrated over 95% accuracy with only ±1.8 mm average deviation, k=0.72 and $r_s$=0.99 from the available precise ground-truth measurements (Table 2). This implies that the computer aided measurement of the Prague lengths is more precise than the measurement by the endoscopists during endoscopy. FIG. 17B shows repeated measurements of C & M lengths for 13 patients during two visits where no increase in Barrett's length were observed by the present method, consistent with the expert finding. Similarly, for patients undergoing radiofrequency ablation (FIG. 17C), decrease in Barrett's segments (mostly C) were marked by the present method. Both of these reproducibility tests provides a substantial evidence of the method's efficacy.

CONCLUSION

The study on oesophagus phantom models with known measurements confirmed the precision of the method. Additionally, the technology was validated in 98 recorded video endoscopies (collected as part of BRC Oxford GI Biobank) against reported C & M lengths by two expert endoscopists. The results showed a strong correlation in all measurements for both phantom and patient data. Quantitative analysis on the endoscopic phantom video data demonstrated over 95% accuracy with a marginal ±1.80 mm average deviation for C & M and island measurements, while for BEA nearly 93% accuracy was achieved with only ±1.11 sq. cm average deviation compared to the ground-truth measurements. On patient data, the method showed a moderate to substantial agreement for kappa statistics, and over 90% correlation for C & M lengths with computed average standard deviations between ±4.5 mm and ±6.0 mm w.r.t. the expert endoscopists measurements. Area quantification for post-treatment reported large BEA of 26.73 cm² for patient with C0 & M0.

The present method provides an accurate and reliable quantification of Barrett's epithelium. The method automatically identifies, delineates and quantifies Barrett's epithelium by recognising the typical landmarks at the top of the gastric folds and the proximal squamocolumnar margins. Based on continuously repeated depth estimation, it enables precise quantitative measurements of the oesophageal mucosa and its 3-dimensional reconstruction. Barrett's oesophageal area measurements using the present method further revealed that the response to known therapeutic interventions (radiofrequency ablation in this study) cannot be reliably quantified solely using Prague lengths. The present method therefore provides a valuable tool for assessing treatment efficacy.

REFERENCES

[1] Sharma, P, Dent, J, Armstrong, D. et al. The Development and Validation of an Endoscopic Grading System for Barrett's Esophagus: The Prague C & M Criteria. *Gastroenterology,* 2006; 131(5): 1392-1399.

[2] Schmidt, R and Singh, K. Meshmixer: An Interface for Rapid Mesh Composition. ACM *SIGGRAPH* 2010; 6:1.

[3] Q. Wang, A. Khanicheh, D. Leiner, D. Shafer, and J. Zobel. Endoscope field of view measurement. *Biomed. Opt. Express* 2017; 8:1441-1454.

[4] Rau, A., Edwards, P. J. E., Ahmad, O. F. et al. Implicit domain adaptation with conditional generative adversarial networks for depth prediction in endoscopy. *Int. J. CARS* 2019; 14:1167-1176. doi: 10.1007/s11548-019-01962-w

[5] Zhengyou Zhang. A flexible new technique for camera calibration. *IEEE Transactions on Pattern Analysis and Machine Intelligence* 2000; 22(11): 1330-1334.

[6] J. Park, Q.-Y. Zhou, and V. Koltun, Colored Point Cloud Registration Revisited, ICCV, 2017.

[7] L C. Chen, Y. Zhu, G. Papandreou, F. Schroff, A. Hartwig, "Encoder-Decoder with Atrous Separable Convolution for Semantic Image Segmentation", The European Conference on Computer Vision (ECCV), 2018, pp. 833-851.

[8] D P. Kingma, and L J Ba. Adam: A method for Stochastic Optimization. International conference on Learning Representations (ICLR), 2015.

The invention claimed is:

1. A method of quantifying an area of Barrett's oesophagus in a subject's oesophagus from a video image of the subject's oesophagus captured using a camera of an endoscope using white-light illumination or narrow-band imaging, the video image comprising successive frames, wherein the method comprises:

performing depth estimation on the frames to derive depth maps in respect of the frames of the video image;

segmenting regions of the frames corresponding to an area of Barrett's oesophagus in the subject's oesophagus; and calculating a value of a geometrical measure of the area of Barrett's oesophagus using the depth map and segmented region in respect of at least one of the frames.

2. A method according to claim 1, wherein the step of performing depth estimation is performed using a machine learning technique.

3. A method according to claim 2, wherein the machine learning technique used in the step of performing depth estimation comprises a feature pyramid network.

4. A method according to claim 3, wherein the feature pyramid network has a Residual Networks backbone.

5. A method according to claim 2, wherein the machine learning technique used in the step of performing depth estimation has been trained using training data measured from a phantom and/or real patients.

6. A method according to claim 2, wherein the step of performing depth estimation on the frames takes account of intrinsic parameters of the camera used to capture the video image.

7. A method according to claim 6, further comprising a step of deriving the intrinsic parameters of the camera from the plural frames using a camera calibration technique.

8. A method according to claim 1, wherein the depth maps represent depths relative to the gastro-oesophageal junction.

9. A method according to claim 1, wherein the step of segmenting regions of the frames is performed using a machine learning technique.

10. A method according to claim 9, wherein the machine learning technique used in the step of segmenting regions of the frames comprises an encoder-decoder framework.

11. A method according to claim 10, wherein the encoder-decoder framework has a Residual Networks backbone.

12. A method according to claim 1, further comprising fitting a shape to the segmented regions of the frames corresponding to an area of Barrett's oesophagus in the subject's oesophagus, the step of calculating a value of a geometrical measure of the area of Barrett's oesophagus using the depth map and the shape fitted to the segmented region in respect of at least one of the frames.

13. A method according to claim 1, wherein the geometrical measure is at least one of:

a circumferential length in accordance with the Prague classification from the gastro-oesophageal junction to the proximal limit of the circumferential extent of the area of Barrett's oesophagus;

a maximal length in accordance with the Prague classification from the gastro-oesophageal junction to the maximal limit of the area of Barrett's oesophagus; and the geometrical area of the area of Barrett's oesophagus.

14. A method according to claim 1, wherein the value of the geometrical measure of the area of Barrett's oesophagus is calculated from the depth map and segmented region in respect of one of the frames.

15. A method according to claim 14, wherein said one of the frames is selected on the basis of user input.

16. A method according to claim 1, wherein the value of the geometrical measure of the area of Barrett's oesophagus is calculated from the depth maps and segmented regions in respect of plural frames.

17. A method according to claim 16, wherein the step of deriving a geometrical measure of the area of Barrett's oesophagus comprises:

estimating a camera pose in respect of each frame from plural frames of the video image and intrinsic parameters of the camera;

deriving a three dimensional image of the area of Barrett's oesophagus from the segmented regions, the depth maps and the estimated camera poses in respect of plural frames; and calculating the value of the geometrical measure of the area of Barrett's oesophagus from the three-dimensional image.

18. A computer program capable of execution by a computer apparatus and configured, on execution, to cause the computer apparatus to perform a method according to claim 1.

19. A non-transitory computer-readable storage medium storing a computer program according to claim 18.

20. An analysis apparatus for quantifying an area of Barrett's oesophagus in a subject's oesophagus using a video image signal representing a video image of the subject's oesophagus captured using a camera of an endoscope using white-light illumination or narrow-band imaging, the video image comprising successive frames, the analysis apparatus comprising:

a depth estimator arranged to perform depth estimation on the frames to derive depth maps in respect of the frames;

a segmentation unit arranged to segment regions of the frames corresponding to an area of Barrett's oesophagus in the subject's oesophagus; and a calculation unit arranged to calculate a value of a geometrical measure of the area of Barrett's oesophagus using the depth map and segmented region in respect of at least one of the frames.

21. A method of quantifying an area of Barrett's oesophagus in a subject's oesophagus from a video image of the subject's oesophagus captured using a camera of an endoscope, the video image comprising successive frames, wherein the method comprises:

performing depth estimation on the frames to derive depth maps in respect of the frames, wherein the depth maps represent depths relative to the gastro-oesophageal junction;

segmenting regions of the frames corresponding to an area of Barrett's oesophagus in the subject's oesophagus; and calculating a value of a geometrical measure of the area of Barrett's oesophagus using the depth map and segmented region in respect of at least one of the frames.

22. A computer program capable of execution by a computer apparatus and configured, on execution, to cause the computer apparatus to perform a method according to claim 21.

23. A non-transitory computer-readable storage medium storing a computer program according to claim 22.

24. An analysis apparatus for quantifying an area of Barrett's oesophagus in a subject's oesophagus using a video image signal representing a video image of the subject's oesophagus captured using a camera of an endoscope, the video image comprising successive frames, the analysis apparatus comprising:

a depth estimator arranged to perform depth estimation on the frames to derive depth maps in respect of the frames, wherein the depth maps represent depths relative to the gastro-oesophageal junction;

a segmentation unit arranged to segment regions of the frames corresponding to an area of Barrett's oesophagus in the subject's oesophagus; and a calculation unit arranged to calculate a value of a geometrical measure of the area of Barrett's oesophagus using the depth map and segmented region in respect of at least one of the frames.

* * * * *